(12) United States Patent
Jones et al.

(10) Patent No.: US 10,139,812 B2
(45) Date of Patent: Nov. 27, 2018

(54) DYNAMIC USER INTERFACE FOR CONFIGURING AND MANAGING A PROCESS CONTROL SYSTEM

(75) Inventors: Bryan M. Jones, Cedar Park, TX (US); Keith R. Bellville, Round Rock, TX (US); James R. Balentine, Austin, TX (US); Cindy A. Scott, Georgetown, TX (US); Hubbard F. Fellows, Round Rock, TX (US); Patricia Devlin, legal representative, Katy, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 886 days.

(21) Appl. No.: 13/120,634

(22) PCT Filed: Sep. 29, 2009

(86) PCT No.: PCT/US2009/058902
§ 371 (c)(1),
(2), (4) Date: Oct. 21, 2011

(87) PCT Pub. No.: WO2010/037145
PCT Pub. Date: Apr. 1, 2010

(65) Prior Publication Data
US 2012/0029661 A1 Feb. 2, 2012

Related U.S. Application Data
(60) Provisional application No. 61/101,055, filed on Sep. 29, 2008.

(51) Int. Cl.
G05B 19/00 (2006.01)
G05B 19/418 (2006.01)
(Continued)

(52) U.S. Cl.
CPC ... G05B 19/41865 (2013.01); G05B 19/0426 (2013.01); G06F 3/0484 (2013.01);
(Continued)

(58) Field of Classification Search
CPC .......... G05B 2219/32097; G05B 2219/31396; G05B 2219/23258; G05B 19/05;
(Continued)

(56) References Cited

U.S. PATENT DOCUMENTS 5,465,358 A * 11/1995 Blades ................. G06F 3/0489
707/E17.005
5,631,825 A 5/1997 van Weele et al.
(Continued)

FOREIGN PATENT DOCUMENTS

CN 1720526 A 1/2006
CN 101103325 A 1/2008
(Continued)

OTHER PUBLICATIONS

Final Cut Pro 6: User Manual, Apple Inc., 2007.*
(Continued)

*Primary Examiner* — Christopher E. Everett
(74) *Attorney, Agent, or Firm* — Marshall, Gerstein & Borun LLP

(57) ABSTRACT

A process control management method in a computer system for configuring and supervising a process plant includes providing an interactive user interface to manage a plurality of objects in the process plant, where each of the plurality of objects corresponds to a physical or logical entity in the process plant, including generating a navigation pane to display a set of selectable items, each in the set of selectable items corresponding to a respective one of the plurality of objects, and generating a command pane to display a set of selectable controls, each in the set of selectable controls
(Continued)

corresponding to a task to be performed on at least one of the plurality of objects in the process plant; receiving a selection of one of an item in the set of selectable items via the navigation panel and a control in the set of selectable controls via the command panel; determining an operational context based on the received selection, wherein the operational context corresponds to one of a range of actions applicable to the selection if the selection is an item selection, or a range of items to which the selection is applicable if the selection is a control selection; and adjusting one of the navigation pane or the command pane according to the operational context, including displaying a subset of selectable items in the navigational pane, wherein each in the subset of selectable items is within the range applicable to the selection, if the selection is a control selection, and displaying a subset of selectable controls in the command pane, wherein each in the subset of selectable controls is within the range applicable to the selection, if the selection is an item selection.

26 Claims, 27 Drawing Sheets

(51) Int. Cl.
  *G06F 3/0484* (2013.01)
  *G05B 19/042* (2006.01)
(52) U.S. Cl.
  CPC .............. *G05B 2219/23258* (2013.01); *G05B 2219/31396* (2013.01); *G05B 2219/32097* (2013.01); *Y02P 90/18* (2015.11); *Y02P 90/20* (2015.11); *Y02P 90/265* (2015.11)
(58) Field of Classification Search
  CPC .............. G05B 19/418; G05B 19/0426; G05B 19/41865; G06F 3/0484
  See application file for complete search history.

(56) References Cited

U.S. PATENT DOCUMENTS

| | | | |
|---|---|---|---|
| 5,884,079 A | 3/1999 | Furusawa | |
| 6,148,244 A | 11/2000 | Tucker et al. | |
| 6,247,020 B1* | 6/2001 | Minard | G06F 8/34 |
| 6,434,500 B1 | 8/2002 | Boehne et al. | |
| 6,442,512 B1 | 8/2002 | Sengupta et al. | |
| 6,445,963 B1 | 9/2002 | Blevins et al. | |
| 6,522,934 B1 | 2/2003 | Irwin et al. | |
| 6,735,596 B2 | 5/2004 | Corynen | |
| 6,834,370 B1 | 12/2004 | Brandl et al. | |
| 6,889,096 B2* | 5/2005 | Spriggs et al. | 700/17 |
| 6,931,288 B1 | 8/2005 | Lee et al. | |
| 7,043,311 B2 | 5/2006 | Nixon et al. | |
| 7,117,052 B2 | 10/2006 | Lucas et al. | |
| 7,152,072 B2 | 12/2006 | Dobrowski et al. | |
| 7,515,977 B2 | 4/2009 | Eryurek et al. | |
| 7,526,347 B2 | 4/2009 | Lucas et al. | |
| 7,526,794 B2* | 4/2009 | Chand et al. | 726/2 |
| 7,680,546 B2* | 3/2010 | Gilbert et al. | 700/17 |
| 7,729,792 B2 | 6/2010 | Lucas et al. | |
| 7,783,370 B2 | 8/2010 | Nixon et al. | |
| 7,971,151 B2 | 6/2011 | Nixon et al. | |
| 8,356,257 B2* | 1/2013 | Husoy et al. | 715/777 |
| 8,516,383 B2 | 8/2013 | Bryant et al. | |
| 8,533,619 B2* | 9/2013 | Baier et al. | 715/771 |
| 8,677,262 B2* | 3/2014 | Baier et al. | 715/772 |
| 9,417,626 B2 | 8/2016 | Jones et al. | |
| 2002/0075333 A1* | 6/2002 | Dutta | G06F 3/04842 |
| | | | 715/862 |
| 2002/0171690 A1* | 11/2002 | Fox | G06F 3/04812 |
| | | | 715/862 |
| 2003/0107591 A1* | 6/2003 | Jameson | 345/744 |
| 2003/0225650 A1* | 12/2003 | Wilson et al. | 705/36 |
| 2003/0233438 A1* | 12/2003 | Hutchinson et al. | 709/223 |
| 2004/0064205 A1 | 4/2004 | Kloper et al. | |
| 2004/0075689 A1 | 4/2004 | Schleiss et al. | |
| 2004/0125141 A1 | 7/2004 | Mori | |
| 2004/0128002 A1 | 7/2004 | Frampton et al. | |
| 2004/0128003 A1 | 7/2004 | Frampton et al. | |
| 2004/0148037 A1 | 7/2004 | Frampton et al. | |
| 2004/0186927 A1* | 9/2004 | Eryurek et al. | 710/12 |
| 2004/0199925 A1 | 10/2004 | Nixon et al. | |
| 2005/0027376 A1* | 2/2005 | Lucas et al. | 700/28 |
| 2005/0027377 A1* | 2/2005 | Lucas et al. | 700/28 |
| 2005/0091072 A1 | 4/2005 | Dunn et al. | |
| 2005/0120288 A1* | 6/2005 | Boehme et al. | 715/500 |
| 2005/0222698 A1 | 10/2005 | Eryurek et al. | |
| 2007/0132779 A1 | 6/2007 | Gilbert et al. | |
| 2007/0179641 A1* | 8/2007 | Lucas et al. | 700/83 |
| 2007/0211079 A1 | 9/2007 | Nixon et al. | |
| 2007/0233629 A1 | 10/2007 | Balog | |
| 2007/0239291 A1* | 10/2007 | Wayland et al. | 700/83 |
| 2008/0034047 A1 | 2/2008 | Rosenberg et al. | |
| 2008/0065705 A1 | 3/2008 | Miller | |
| 2008/0065706 A1 | 3/2008 | Miller et al. | |
| 2008/0077512 A1* | 3/2008 | Grewal | 705/28 |
| 2008/0125877 A1 | 5/2008 | Miller et al. | |
| 2008/0189638 A1 | 8/2008 | Mody et al. | |
| 2008/0208380 A1* | 8/2008 | Taylor | 700/108 |
| 2009/0094549 A1 | 4/2009 | Adams | |
| 2009/0327942 A1 | 12/2009 | Eldridge et al. | |
| 2010/0168874 A1 | 7/2010 | Lucas et al. | |
| 2010/0179669 A1 | 7/2010 | Wegener | |
| 2011/0173556 A1* | 7/2011 | Czerwinski et al. | 715/771 |
| 2012/0041570 A1 | 2/2012 | Jones et al. | |

FOREIGN PATENT DOCUMENTS

| | | |
|---|---|---|
| EP | 0 718 727 A2 | 6/1996 |
| EP | 1 460 500 A1 | 9/2004 |
| EP | 1 906 279 A2 | 4/2008 |
| EP | 1 923 760 A2 | 5/2008 |
| GB | 2 351 815 A | 1/2001 |
| GB | 2 458 561 A | 9/2009 |
| JP | H07-141137 A | 6/1995 |
| JP | H11-232349 A | 8/1999 |
| JP | 2000-347721 A | 12/2000 |
| JP | 2001-042904 A | 2/2001 |
| JP | 2001-195121 A | 7/2001 |
| JP | 2001-216003 A | 8/2001 |
| JP | 2001-331215 A | 11/2001 |
| JP | 2002-189514 A | 7/2002 |
| JP | 2004-318830 A | 11/2004 |
| JP | 2005-50342 | 2/2005 |
| JP | 2005050342 A | 2/2005 |
| JP | 2006-338343 A | 12/2006 |
| JP | 2007-536631 A | 12/2007 |
| JP | 2007-537513 A | 12/2007 |
| JP | 2007-538310 A | 12/2007 |
| TW | 200746338 A | 12/2007 |
| WO | WO-95/09387 A1 | 4/1995 |
| WO | WO-2008/005446 A1 | 1/2008 |
| WO | WO-2008/145290 A1 | 12/2008 |
| WO | WO-2010/037146 A2 | 4/2010 |

OTHER PUBLICATIONS

Combined Search and Examination Report for Application No. GB1222398.8, dated Jan. 22, 2013.
Examination Report for Application No. GB1104569.7, dated Feb. 16, 2012.
Examination Report for Application No. GB1104593.7, dated Feb. 24, 2012.
Examination Report for Application No. GB1104593.7, dated Oct. 12, 2012.
Examination Report for Application No. GB1104569.7, dated Feb. 4, 2013.
Search Report for Application No. GB1223348.2, dated Jan. 30, 2013.

(56) References Cited

OTHER PUBLICATIONS

First Office Action for Chinese Application No. 200980149371.1, dated Jun. 7, 2013.
First Office Action for Chinese Application No. 20098014365.6, dated Nov. 27, 2012.
Second Office Action for Chinese Application No. 20098014365.6, dated Jul. 8, 2013.
Notice of Reasons for Rejection for Japanese Application No. 2011-529381, dated Aug. 16, 2013.
Anonymous, "CFC for SIMATIC S7-Manual," Retrieved from the Internet on Jan. 14, 2010: URL:http://www2.ad.siemens.com.cn/download/Upload/AS/manual/24451339.pdf.
International Search Report or Application No. PCT/US2009/058902, dated Jun. 28, 2010.
International Search Report for Application No. PCT/US2009/058903, dated Apr. 27, 2010.
Notice of Reasons for Rejection for Japanese Application No. 2011-529380, dated Sep. 5, 2013.
Third Office Action for Chinese Application No. 20098014365.6, dated Jan. 27, 2014.
International Preliminary Report on Patentability for Application No. PCT/US2009/058902, dated Mar. 29, 2011.
International Preliminary Report on Patentability for Application No. PCT/US2009/058903, dated Mar. 29, 2011.
Decision of Refusal in Japanese Application No. 2011-529380, dated Mar. 11, 2014.
English translation of Chinese Office Action for Application No. 200980148371.1, dated Feb. 28, 2015.
Non-final Office Action for U.S. Appl. No. 13/120,632, dated Apr. 10, 2014.
Final Office Action for U.S. Appl. No. 13/120,632, dated Nov. 21, 2014.
Notice of Reasons for Rejection for Japanese Application No. 2013-254713, dated Nov. 4, 2014.
Office Action cited in JP 2013-236459, dated Jul. 29, 2014.
Office Action issued in Japanese Patent Application No. 2014-141141, dated May 26, 2015.
English translation of Chinese Office Action for Application No. 20098018371.1, dated Sep. 15, 2015.
English translation of Office Action for Japanese Patent Application No. 2013-236459, dated Jun. 30, 2015.
English translation of Office Action for Chinese Application No. 200980148371.1, dated Aug. 4, 2014.
English translation of Office Action for Japanese Patent Application No. 2014-141141, dated Jan. 19, 2016.
English translation of Office Action for Japanese Patent Application No. 2013-254713, dated Nov. 4, 2015.
AutoCAD 2007 User's Manual, Autodesk, Inc. (2006).
First Office Action for Chinese Application No. 201410524985.8, dated Aug. 22, 2016.
First Office Action for Chinese Application No. 201410579912.9, dated Jan. 24, 2017.
Notice of Reasons for Rejection for Japanese Application No. 2016-040800, dated Jan. 10, 2017.
Second Office Action for Chinese Application No. 2014110524985.8, dated May 2, 2017.

* cited by examiner

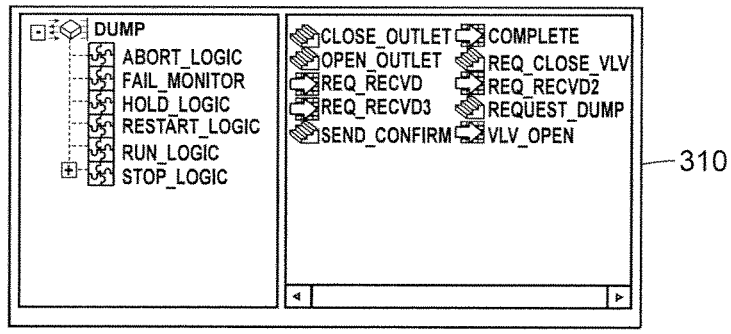
Phase Class Example
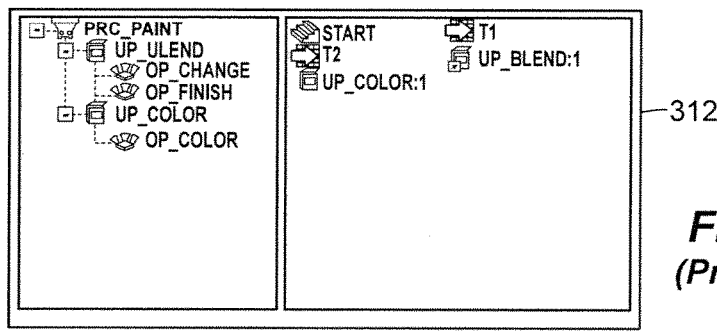
Recipe Example
FIG. 4
*(Prior Art)*
FIG. 5
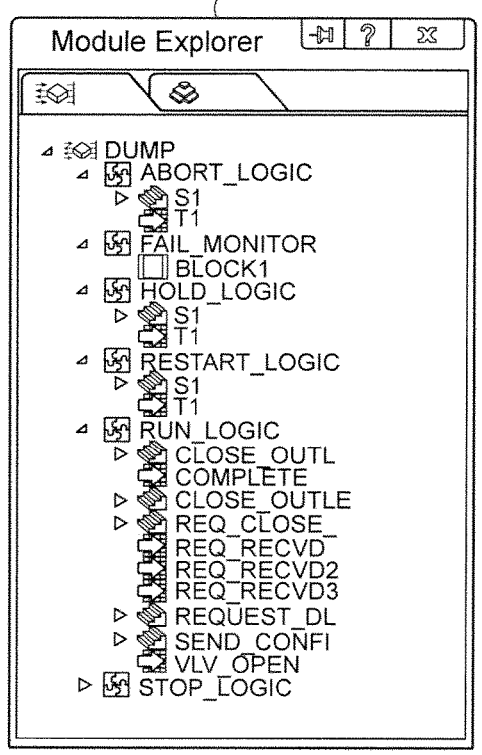
Phase Class Example
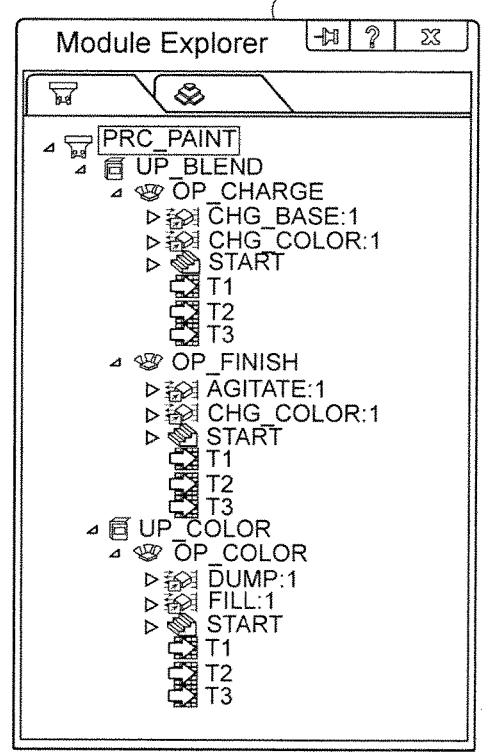
Recipe Example

| PROCEDURE | UNIT PROCEDURE | OPERATION | PHASE CLASS |
|---|---|---|---|
| | UP1 | OP1 | PC1 |
| | | | >PARAM1 |
| | | | >PARAM2 |
| | | | >PARAM3 |
| | | OP2 | PC2 |
| | | | PC3 |

*FIG. 31A*

| PROCEDURE | UNIT PROCEDURE | OPERATION | PHASE CLASS |
|---|---|---|---|
| | UP1 | OP1 | PC1 |
| | | >OP_PARAM1 | >PARAM1 |
| | | | >PARAM2 |
| | | | >PARAM3 |
| | | OP2 | PC2 |
| | | | PC3 |

*FIG. 31B*

| PROCEDURE | UNIT PROCEDURE | OPERATION | PHASE CLASS |
|---|---|---|---|
| PRC_PARAM1 | UP1 | OP1 | PC1 |
| | >UP_PARAM1 | >OP_PARAM1 | >PARAM1 |
| | | | >PARAM2 |
| | | | >PARAM3 |
| | | OP2 | PC2 |
| | | | PC3 |

*FIG. 31C*

| PROCEDURE | UNIT PROCEDURE | OPERATION | PHASE CLASS |
|---|---|---|---|
| PRC_PARAM1 | UP1 | OP1 | PC1 |
| | | >OP_EXISTING_PAR | >PARAM1 |
| | | | >PARAM2 |
| | | | >PARAM3 |
| | | OP2 | PC2 |
| | | | PC3 |

*FIG. 31D*

DYNAMIC USER INTERFACE FOR CONFIGURING AND MANAGING A PROCESS CONTROL SYSTEM

CROSS-REFERENCE TO RELATED APPLICATION

This application claims the benefit of U.S. Provisional Patent Application No. 61/101,055, entitled "User Interface for Configuring a Process Control System," filed Sep. 29, 2008, the disclosure of which is hereby expressly incorporated herein by reference.

FIELD OF TECHNOLOGY

The present invention relates generally to process control networks and, more particularly, to a user interface for configuring various components and services in a process control environment.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views of the process control routine or module, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been separately created as part of, or to independently support the specific applications with which they are associated, and thus are generally limited in usefulness to the specific process function for which they were created. For example, it is difficult, if not impossible, to use a graphical program created to support a control operator in a context involving maintenance, configuration, or simulation functions.

Further, the existing applications typically require a large number of clicks of selections to reach a desired menu item. In particular, operators or maintenance personnel interested in "drilling down" into a module often have to activate numerous menus, review and respond to multiple dialogues, etc. In many cases, controls for triggering tasks are not organized in an intuitive manner, and accordingly require a significant amount of time to master.

In another aspect, the ever-increasing number of command options and features continues to make process control design, configuration, and management more complex. A typical user often sees numerous controls and menu items on the screen whereas only a relatively small subset of these controls or menu items is applicable to the task the user performing.

SUMMARY OF THE DISCLOSURE

A software system for configuring, supervising, or troubleshooting a process control system includes an intuitive task-based user interface that conveniently organizes visual and textual controls for the available functionality. The user interface reduces the number of time of "clicks" or other commands required to access the desired functionality, positions the controls in intuitive and convenient locations, reduces the number of windows necessary to depicting desired information, displays controls relevant to a particular context, presents visual cues to the user for quick identification of the desired option or control, implements techniques for effectively visualizing control strategies, and improves the overall convenience of using the software system. The software system may support, for example, functionality of configuring the process control system, viewing configuration of the process control system, downloading control modules to controllers and physical devices, defining control logic for continuous and batch control, creating and editing product recipes in a process control system, controlling batch execution according to these recipes, exploring or viewing plant equipment, or any combination thereof. In some embodiments, the software system is an application suite that includes several applications, each adapted to support a respective set of engineering activities. For example, the software suite in one embodiment includes an explorer application for configuring a process plant, viewing and updating configuration of the process plant, downloading control modules to physical entities, etc.; a control studio application for designing control strategies for use in the process plant; and other applications. Each of the applications included in the software suite includes a respective user interface.

In an embodiment, the user interface of the explorer application supports a main content pane in which the explorer applications provides a detailed view of one or several selected items such as physical devices operating in the process plant, logical structures such as control strategies defined using Fieldbus function blocks, for example, process parameters associated with a selected physical or logical entity, configuration parameters applicable to devices and control strategies and stored in the corresponding databases, etc.

The user interface further supports at least some of a navigation pane to display various controls and indicators to permit users to more easily locate and select various physical and logical entities in the process plant; a status bar to display the status of an operation; an address bar to specify a current location; a preview pane to provide a graphic and/or text reduced in quality and size to the user; a details pane to provide a detailed depiction of physical or logical entity; an instant search pane to support searching through one or several configuration database, run-time data, recipes, and other content; and a command bar in which the explorer application provides controls for performing engineering tasks.

The user interface of the control studio application also includes a main content/edit pane for viewing, creating, and editing content. For example, a user may design and configure connections between function blocks of a distributed control system, define a product recipe, etc. The user interface may further include some or all of a navigation hierarchy pane to depict relationships between physical and logical elements of the process control system in a structured and organized manner, a parameter pane to provide information related to one several entities illustrated in the main pane, an alarm pane to display current alarm or event data, a reference pane to display logical connections of various objects to physical or logical entities, a watch pane to display trending and/or historical data for a selected parameter, a pan-and-zoom pane, and a palette pane to list control elements that can be used as building blocks in defining control logic.

The user interface of some embodiments of the software system further supports a set of navigational indicators that reflect the history of selecting a particular menu item or control. The user interface automatically augments the set of navigational indicators after each intermediate menu item is selected, so that the user can easily restore the path to the selected menu item from the main menu. In an embodiment, each navigational indicator is also a control that restores focus to the respective level of the menu in response to a user-initiated event (e.g., left-click event on the mouse).

In some embodiments, the user interface of at least applications included in the software system further supports a pop-up window that "hovers" over an item in the main content pane when the user places the cursor over the item, for example. The pop-up window may display a subset of available properties, parameters, and controls associated with the item. In an embodiment, a pop-up window displayed for a graphic or symbol representing a device in the process plant includes a description of the device, node assignment, scan rate of the device (e.g., the frequency at which the device generates measurements), and last modification date. In an embodiment, this feature is selectively activated by a user, and the items displayed in the pop-up window are user-configurable.

In one aspect, the user interface generates a reduced of menu selections in response to user right-clicking or otherwise selecting an item in the main content pane, and an extended set of menu selections in response to user right-clicking on the item in conjunction with activating another control.

In some embodiments, the user interface of the explorer application, control studio application, and other applications associated with the software system displays the available controls and options of the software system in a "ribbon"—style menu pane. The menu may include several tabs, each tab having a group of controls or options related to a particular area of functionality. For example, one tab may be labeled "home" and may include controls related to clipboard functions, history options, download functions, algorithm editing options, etc.; another tab may be labeled "view" and may include palette view options, parameter view options, window arrangement options, etc.; and tabs may be labeled "diagram," "settings," etc. Further, additional tabs may appear according to the operational context or in response to an operator action.

In at least some embodiments, only one tab is in focus at one time, with the ribbon concealing the functions associated with the remaining tabs. To access functions assigned to another tab, the user may click on the visual identifier of the tab, for example, thereby bringing the selected tab into focus. Further, controls and options may be further grouped on each tab, with each group clearly labeled, to help the user quickly locate the desired function on the tab. For example, the "home" tab may include a "clipboard" grouping, a "module" grouping, an "insert" grouping, etc. Each grouping may be additionally separated by a vertical bar or another boundary delimiter.

In some embodiments, each control may include both a textual and a visual indicator (e.g., an icon clearly suggestive of the function corresponding to the control). Additionally, functions unavailable due to the context, for example, may be displayed in a "ghost" or otherwise grayed-out manner. In other embodiments, the user interface may dynamically add or completely remove icons and textual descriptors of functions according to availability of these options. In some such embodiments, the manner of presentation of unavailable functions may be user-selectable.

In an embodiment, the user interface may automatically optimize the layout of controls according to use. For example, the user interface may display commonly used controls in more prominent locations on the corresponding tab. To this end, the user interface may co-operate with a software module that collects statistical data corresponding to the use of various functions supported by the software system. Further, the user may select which panes, and in what position relative to other panes, should be displayed upon his or her login into the software system as a part of a custom view. Additionally, each custom view may specify a size of the one or several selected panes, view preferences (e.g., detailed view, a list view), and other options.

In some embodiments, the user interface may include only those functions on the tabs and the ribbon that are available in a given configuration of the software system. For example, if the user purchases a partial license or only some of the available licenses for the software module, the user interface may completely hide the unpaid-for options, which sometimes may correspond to an entire tab.

In some embodiments, the user interface also displays a quick access toolbar separately from the ribbon menu, e.g., on top of the ribbon menu. The quick access toolbar may display textual identifiers, icons, or both for such frequently-used functions as "save," for example. The controls made available through the quick access toolbar need not correspond to a common group or may not even reside on the same tab. In at least some of the embodiments, the quick access toolbar may be user-configurable relative to a default set of controls.

The zoom feature of the pan-and-zoom pane can enlarge a part or all of the content in the main pane of the explorer application, the control studio application, or another application associated with the control system. In some of these embodiments, the zoom function may be a slide bar so that the user may easily select the desired size of graphics presented in the main pane. Further, the user interface may enlarge or reduce the graphics displayed in the main pane in real time as the user operates the zoom control. In other words, the user need not enter a target enlarge percentage to see whether the selected size is satisfactory as is common in most software applications.

In some embodiments, the palette pane of the control studio application includes icons for efficient selection and placement in the main pane via a drag-and-drop operation, for example. The icons may correspond to control blocks or other functional elements. The user interface may group the icons into categories based on the functionality which the icon represent or according to any other principle. The user interface may additionally allow the user to define a custom category for his or her specific preferences. In some of the embodiments, the user interface may automatically populate the custom category based on the observed usage of the system functionality, for example.

The user interface may also include an expression editor for configuring logic expressions. The user interface may invoke the same expression editor in response to a user launching an editor from the control studio application, the explorer application, an application responsible for viewing enterprise-level configuration and assets, an application for viewing and troubleshooting plant equipment, etc.

The expression editor allows users to insert structured text (e.g., functions, constants, operands, etc.) in an intuitive manner. To simplify the configuration effort and reduce the probability of an error, the expression editor may automatically remove unavailable options and controls from the corresponding toolbar which may be a ribbon menu, for example, a tab of a ribbon menu, or a group of functions on one of the tabs. Preferably, the expression editor functions are disposed on a single tab with several groups such as, for example, "operators," "function library," "system functions," "editing functions," "clipboard functions," etc. In an embodiment, the expression editor may include a quick access toolbar with several controls for such general commands as open, save, undo, etc. The user preferably has an ability to edit the quick access toolbar to add, remove, or reposition controls, for example. In some embodiments, the expression editor may enable a user to insert code snippets to reuse common code. Further, the expression editor may automatically display correct syntax for the command the user enters into the editing pane of the expression editor.

Additionally, the software system may provide automatic and manual filtering of menu items based on the current context of another one or several panes being displayed by the user interface. For example, items in a hierarchical tree displayed in the navigation pane may be automatically added, eliminated, moved up or down, or otherwise adjusted based on an item in the main pane to which the cursor is most proximate, or based on an action the user activates via the command bar. In another embodiment (or according to another configuration option), the software system may filter items in the navigation pane according to the job function of the user. The software system may similarly filter commands in the command bar. In some embodiments, the filtering options are saved as a part of the custom configuration.

The user interface of the explorer application may further allow users to customize at least some of placement, sizing, filtering, grouping, and stacking of columns in the main content area to define custom column layouts. In general, custom column layout eliminate the necessity to adjust columns each time in order to fit the desired amount of text on the screen. In an embodiment, the software system automatically saves the generated layout to reconstruct the layout in the next session (i.e., upon recognizing login credentials of the user). The user may also configure several custom column layouts for various types of tasks or according to other technical needs.

In some embodiments, panes can be toggled on and off, resized, undocked and re-docked, and floated to facilitate customizing the environment according to a user preference. These and other user preferences may be saved as a part of customizing the layout.

In some embodiments of the control studio application, the user interface of the control studio applications supports multiple edit panes that can be disposed in a common edit area of the user interface. A user can configure and view one or several logic blocks (e.g., Fieldbus function blocks) in each pane. To simplify the process of defining interactions between logic blocks being displayed in different panes, the user interface allows the user to select an output of a logic block displayed in a first pane, drag a connector beyond the boundaries of the pane to an input of a logic block displayed in a second pane, and complete the connection. The user interface may display a connection indicator (i.e., a line) spanning several panes within the edit area of the user interface. In another embodiment, the user interface may display tags (which may be color-coded for clarity, for example) that identify a pane in which the connection is completed at each input or output of a logic block coupled to a logic block in a different pane. In this manner, the user may quickly and efficiently define connections between logic blocks without trying to arrange all logic blocks in a single pane or launching multiple dialogue windows. In another aspect, the user may easily identify all connections in a particular pane that are not completed within the pane. This feature may greatly simplify inspection and debugging of control strategies by eliminating the need to "hunt" for endpoints of connections across multiple views.

In another aspect, the user interface may automatically morph screens to better anticipate future actions the user may take, and to automatically optimize the layout according to a particular task the user is performing. The user interface may initially present to a user a screen that includes a command pane with an original set of commands, a main content/edit pane, a navigational pane, or other default panes. Each of the displayed panes may be of a default size and in a default position relative to every other pane. In response to the user activating a control via the command pane, the user interface may take several actions in addition to propagating the user command to the execution engine for execution. In some embodiments, the user interface may automatically display one or several additional panes, size these additional panes based on an amount of information to be displayed in these additional panes, and adjust the previously displayed panes to accommodate the new panes. Further, the user interface may automatically adjust controls in the command pane by hiding (e.g., removing) controls unrelated to the previous user command selection (or, in some embodiments, statistically unlikely to be invoked following the user's previous control selection), add new controls which may be relevant to the user in view of the previous control selection, adjust the positioning and size of controls (e.g., buttons, groups of buttons), adjust the font sizes in some of the panes, etc. Thus, the user need not manually undock, activate, move, or resize panes upon selecting a certain mode of operation.

In some embodiments, the user interface may similarly morph screens and, in particular, panes in response to selections in the navigational pane. Further, the user interface may allow the user to save his or her preferences with respect to positioning of panes, size of panes, text, graphics, etc. to morph screens in accordance with both user preferences (e.g., no font size less than 10) and predefined principles (display an unresolved references pane below the main content/edit pane in response to user activating a download option). Still further, the user interface may morph screens at multiple stages of operation to continue to adjust to the particular task the user is performing.

In another aspect, the user interface supports efficient techniques for associating parameters during recipe configuration for batch control. The control studio application may display an interactive screen listing the names various procedures, unit procedures, operations, and phase classes of a recipe. In an embodiment, the procedures, unit procedures, operations, and phase classes are displayed in respective columns to define an interactive table. To defer a phase class parameter to the level of an operation, for example, a user may click on the name of a desired phase class or activate another control to view the parameters defined for the selected phase class, select a parameter, and drag-and-drop the selected parameter in the location in the interactive table corresponding to a target operation. The user interface can then automatically generate a parameter name using pre-defined naming conventions (e.g., stored as a set of rules in a database), display the newly generated parameter in the section of the interactive table corresponding to the operation, and associate the parameter with the deferred parameter, i.e., generate and store a link between the deferred phase class parameter and the deferred-to operation parameter.

In at least some of the embodiments, the user interface further allows users to drag-and-drop parameters across several layers of the hierarchy, e.g., from the level of a phase class to the level of a unit procedure, and automatically generates parameters along with the associated textual descriptors at each intermediate level. Moreover, the user interface may support assigning parameters to pre-existing parameters via the same or similar drag-and-drop operation. In this manner, the user need not interact with multiple dialogues or select and activate (or type) commands for deferring or assigning parameters.

BRIEF DESCRIPTION OF THE DRAWINGS

FIG. 4 illustrates a known two-pane layout of a tree for phase class items or recipe items.

FIG. 5 illustrates an example tree layout for the items of FIG. 4 generated by the user interface of the system illustrated in FIG. 1.

FIGS. 31A-C illustrate several example screens which the module illustrated in FIG. 28 may generate as a part of parameter deferral during recipe configuration.

FIG. 31D illustrates an example screen which the module illustrated in FIG. 28 may generate during assignment of a parameter to a pre-existing parameter on a different level of recipe hierarchy during recipe configuration.

DETAILED DESCRIPTION

A software-based process control system for defining, editing, and debugging control strategies, supervising the operation of a process plant in which control strategies are implemented, managing equipment, and performing other activities may include an interactive user interface for use by people engineers, operators, maintenance personnel. By providing context-specific dynamic menus, intuitive control items, configurable layout of panes, etc., the user interface reduces the time required to perform a desired task in the process control environment. Further, by supporting multi-pane editing and implementing techniques for generating visible connectors spanning multiple panes or deferring and linking parameters during recipe configuration, to consider just two examples, the user interface simplifies various engineering tasks and improves the overall user experience. An example process control system in which the user interface may be implemented is discussed first with reference to FIGS. 1 and 2. Various techniques applicable to applications that support all or respective portions of the user interface are discussed with reference to FIGS. 3-31C. As explained in more detail below, these applications may include an application for designing control strategies (also referred to herein as a control studio application), and an application for locating, viewing, configuring, and downloading data related to various physical and logical entities such as controllers, physical devices, control strategies (also referred to herein as an explorer application).

I. Operator Interface Applications in a Process Control Plant

Figure 1:
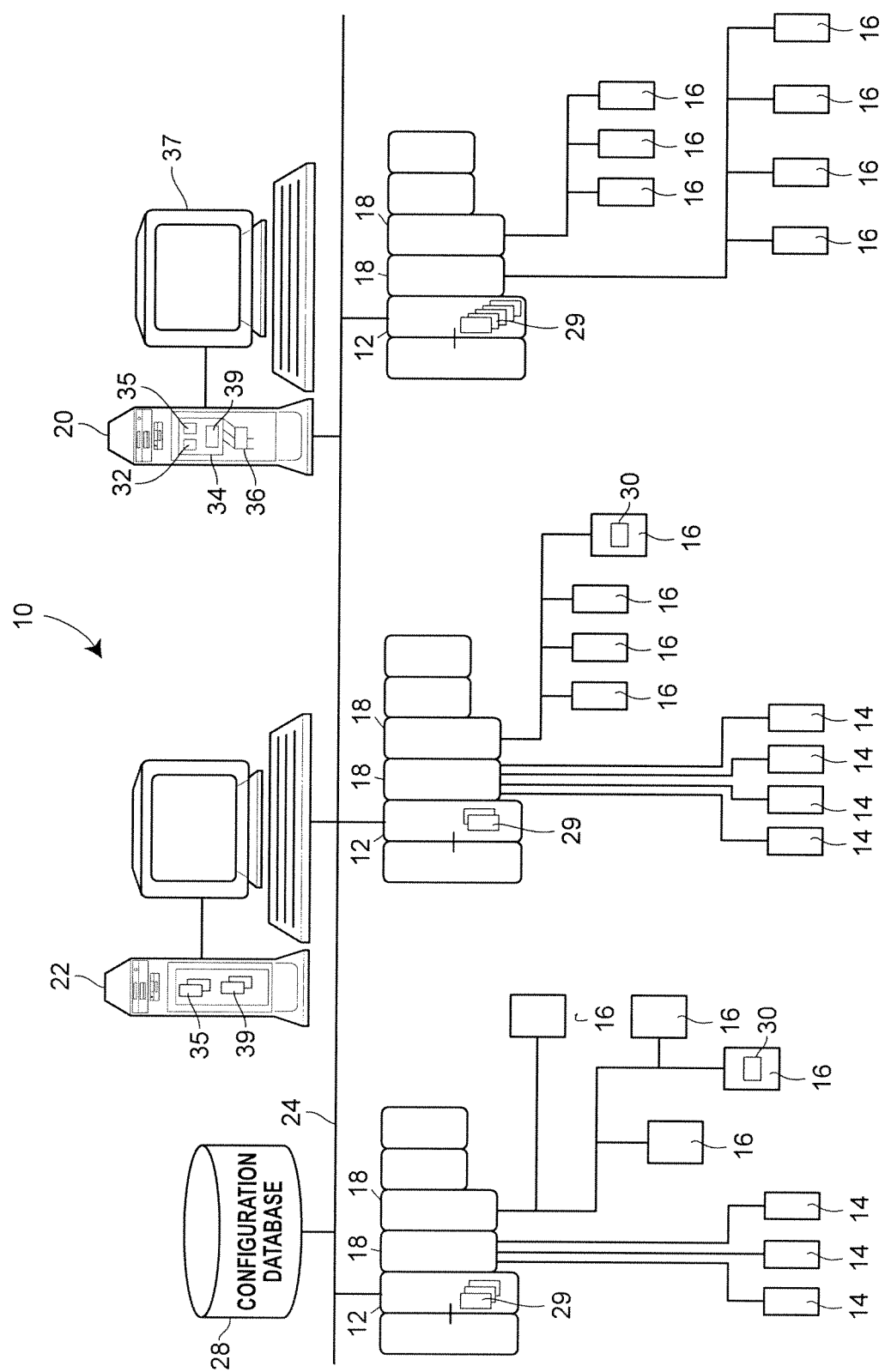
FIG. 1 is a block diagram of a distributed process control network located within a process plant including an operator workstation that implements some or all of the user interface generation techniques of the present disclosure.

Referring now to FIG. 1, an example process plant 10 in which smart and/or non-smart process objects are used to form process graphic displays and process modules, both of which may be integrated with control modules to provide enhjhanced control and simulation within the plant environment, is illustrated in detail. In particular, the process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian that collects and stores parameter, status and other data associated with the controllers and field devices within the plant 10 and/or as a configuration database that stores the current configuration of the process control system within the plant 10 as downloaded to and stored within the controllers 12 and field devices 14 and 16. While the controllers 12, I/O cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstation 20 includes a suite of operator interface applications 32 and data structures which can be accessed by any authorized user (e.g., configuration engineers, operator, maintenance technicians, shift managers, other types of users) to view and provide functionality with respect to devices, units, etc. connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in and executed in other workstations or computer devices within or associated with the plant 10. Furthermore, the suite of applications can provide display outputs to a display screen 37 associated with the workstation 20 or any other desired display screen or display device, including hand-held devices, laptops, other workstations, printers, etc. Likewise, the applications within the suite of applications 32 may be broken up and executed on two or more computers or machines and may be configured to operate in conjunction with one another.

Generally speaking, the suite of applications 32 provides for or enables the creation and use of three different types of entities, the operation of which may be integrated together to provide for enhanced control, simulation, and display functions within the process plant 10. More particularly, the suite of applications 32 may be used to create and implement process graphic displays 35 (which generally provide an operator display pertaining to a portion of the process plant), process modules 39 (which generally provide a simulation of a portion of a process plant) and process control modules, such as the control modules 29, which generally provide or perform on-line control of the process. The process control modules 29 are generally well known in the art and may include any type of control module, such as function block control modules, etc. The process graphic display elements 35, which will be described in more detail below, are generally elements that are used by an operator, engineer or other displays to provide information to a user, such as an operator, about the operation, configuration or set-up of the process plant and the elements therein. The process modules 39 are generally closely tied to the process graphic display elements 35 and may be used to perform simulations of the operation of the process plant or of some of the different elements therein connected in the manner depicted in the process graphic displays 35. The process graphic displays 35 and process modules 39 are illustrated as being stored in and executed by the workstations 20 and 22, although the process graphic displays 35 and the process modules 39 could be downloaded to and executed in any other computer associated with the process control plant 10, including laptops, handheld devices, etc.

Figure 2:
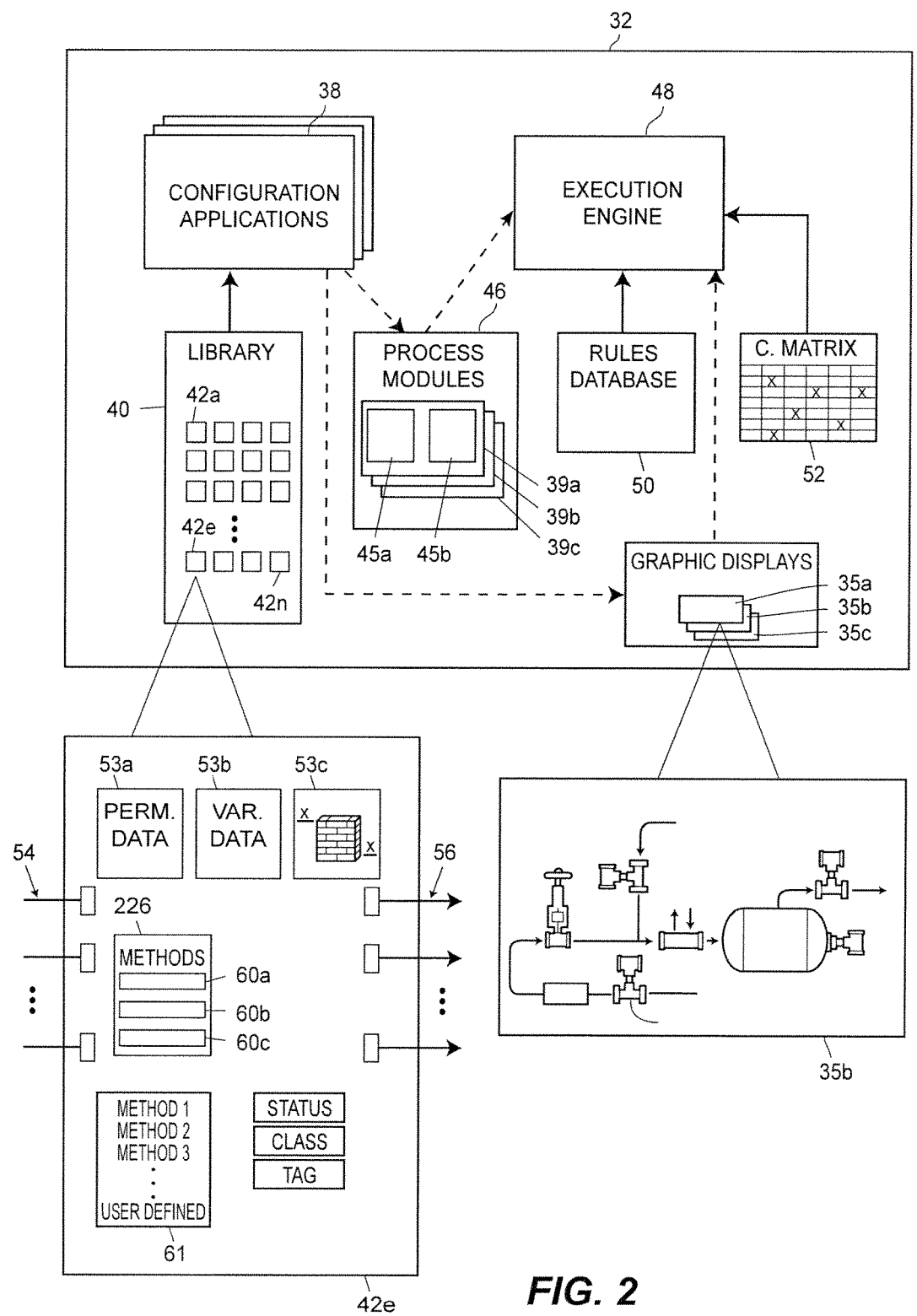
FIG. 2 is a logical block diagram of a set of applications and other entities, including smart process objects and process modules, stored in the operator workstation of FIG. 1, which may be used to implement enhanced functionality in a process plant.

FIG. 2 illustrates some of the applications and data structures or other entities within the suite of applications 32 of the workstation 20. In particular, the suite of applications 32 includes control module, process module, and graphic display configuration applications 38 which are used by a configuration engineer to create control modules, process modules (also called process flow modules) and the associated graphic displays. In some embodiments, the configuration applications 38 include a control logic design and configuration application, referred to herein as a control studio application 38A, and an application for locating and configuring various entities in a process plant, downloading control modules to physical entities, etc., referred to herein as an explorer application 38B. While the control studio application 38A may be any standard or known control module configuration application, the process module and graphic display configuration application(s) may create process modules and graphic displays using one or more smart process objects, the nature of which will be described in more detail below. Still further, while the process module and process graphic configuration applications 38 are shown separately, one configuration application could create both of these types of elements.

A library 40 of smart process objects 42 includes example or template smart process objects 42 that may be accessed, copied and used by the configuration application 38 to create process modules 39 and graphic displays 35. As will be understood, the configuration application 38 may be used to create one or more process modules 39, each of which is made up of or created from one or more smart process objects 42 and may include one or more process flow or simulation algorithms 45, which are stored in a process module memory 46. Additionally, the configuration application 38 may be used to create one or more graphic displays 35, each of which is made up of or created from one or more smart process objects 42 and may include any number of display elements connected together. One of the graphic displays 35b is illustrated in FIG. 2 in expanded form and includes a depiction of a set of process elements, such as valves, tanks, sensors and flow transmitters, interconnected by connection elements which may be pipes, conduit, power cables, conveyors, etc.

An execution engine 48 operates or implements each of the graphic displays 35 and the process modules 39 during runtime to create one or more process displays for an operator as defined by the graphic displays 35 and to implement simulation functionality associated with the process modules 39. The execution engine 48 may use a rules database 50 defining the logic to be implemented on the process modules 39 as a whole and the smart process objects within those modules in particular. The execution engine 48 may also use a connection matrix 52 which defines the connections between the process elements within the plant 10 as well as within the process modules 39 to implement the functionality for the process modules 39.

FIG. 2 illustrates one of the smart process objects 42e in more detail. While the smart process object 42e is illustrated as being one of the template smart process objects, it will be understood that other smart process objects will generally include the same or similar elements, features, parameters, etc. as described with respect to the smart process object 42e and that the specifics or values of these elements, features and parameters may be changed or varied from smart process object to smart process object depending on the nature and use of that smart process object. Furthermore, while the smart process object 42e may be an object within an object oriented programming environment and thus include data stores, inputs and outputs and methods associated therewith, this smart process object may be created by and implemented within any other desired programming paradigm or protocol.

As will be understood, the smart process object 42e, before being instantiated, is an object that is associated with a particular type of entity, such as a physical or a logical entity, within the process plant 10 of FIG. 1. However, after being copied and instantiated, the smart process object 42e may be tied to a particular entity within the process plant. In any event, the smart process object 42e includes a data store 53 that is used to store data received from or pertaining to the logical entity with which the smart process object 42e is associated. The data store 53 generally includes a data store 53a that stores general or permanent information about the entity to which the smart process object 42e pertains, like manufacturer, revision, name, type, etc. A data store 53b may store variable or changing data, such as parameter data, status data, input and output data, cost or other data about the entity to which the smart process object 42e pertains including data associated with the entity as it has existed in the past or as it now exists within the process plant 10. Of course, the smart process object 42e may be configured or programmed to receive this data (e.g., cost data) on a periodic or non-periodic basis, from the entity itself via any desired communication link, from the historian 28 via the Ethernet bus 24 or in any other desired manner. A data store 53c may store a graphical representation of the entity to which the smart process object 42e pertains and which is used for actual display to the operator via an operator interface, such as the screen 37 associated with the workstation 20 of FIG. 1. Of course, the graphical representation may include place holders (marked by underlines within the data store 53c) for information about the entity, such as information defined by the parameter or other variable data about the entity as stored in the data store 53b. This parameter data may be displayed in the graphical place holders when the graphical representation is presented to the operator on a display device 37 as part of one of the graphic displays 35. The graphical representation (and the smart process object 42e) may also include predefined connection points (marked by an "X" in the data store 53c) that enable an operator or configuration engineer to attach upstream or downstream components to the process element, as depicted by the graphical representation. Of course, these connection points also enable the smart process object 42e to be aware of the elements connected to that smart object as configured within a process module and may specify a type of connection element that must be used, such as a pipe, a duct, etc., a stream associated with that element, etc.

The smart process object 42e may also include one or more inputs 54 and outputs 56 to enable communication with other smart process objects within or outside of a process module in which the smart process object 42 is used. The connections of the inputs 54 and outputs 56 to other smart process objects may be configured by a configuration engineer during configuration of a process module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42e or to provide communications of data stored within or generated by the smart process object 42e to other smart process objects. These inputs and outputs may also be used to provide communications between the smart process object 42e and other objects within the process control system, such as control modules within the controllers 12, field devices 14, 16, etc.

As illustrated in FIG. 2, the smart process object 42e also includes a method storage 58 that is used to store zero, one or more methods 60 (illustrated as methods 60a, 60b and 60c in FIG. 2) which may be algorithms to be implemented by the smart process object 42e during execution of a process module in which the smart process object 42e is used. Generally, the methods 60 stored in the method storage 58 will use the data stored within the data storage portions 53a and 53b and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42e, errors associated with that or other entities within the process plant 10, etc. The methods 60 may be preconfigured or provided based on the type or class of smart process object and will generally be executed each time the smart process object 42e is executed within the execution engine 48 during runtime. Some example methods 60 that may be provided within a smart process object, such as the smart process object 42e, include detecting leaks, dead band, dead time, movement, variability, condition monitoring, computing costs, or other conditions associated with the entity.

The methods 60 may also be provided to help simulate the operation of the process entity associated with the smart process object on the material flowing through that process entity. Thus, the methods 60 may be provided to calculate mass balances, energy balances, flows, temperatures, compositions, vapor states, and other system-level or stream level parameters associated with the material in the plant 10, to simulate operation of the element so as to calculate expected outputs based on provided inputs, etc. Of course, these are but a few of the methods that can be stored in and run by a smart process object 42e, and there are many other methods that may be used, with such methods generally being determined by the type of entity being represented, the manner in which that entity is connected in and used in a process plant as well as other factors. It is important to note that, while the smart process object 42e may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be referenced to or may define applicable rules within the rule database 50 that should be run for the smart process object 42e during execution.

If desired, each smart process object may include a library of applicable algorithms or methods which may be used to define the simulation behavior of the smart process object when connected within a process module. Such a library is illustrated in a pull down menu 61 for the smart process object 42e of FIG. 2 and a similar menu may be associated with each other smart process object. The configuration engineer may define the simulation behavior of a smart process object when this smart process object is placed in a process module 39 by selecting one of the library of simulation algorithms (called method 1, method 2, etc.) via, for example, the pull down menu 61. In this manner, the configuration engineer may define different simulation behaviors for a smart process object depending on the type or nature of the process for which the smart process object is being used to model.

If desired, the configuration engineer may instead provide a proprietary or other user supplied algorithm to define the simulation behavior of the process element defined by the smart process block. Such a user defined algorithm (illustrated as the "user defined" entry in the pull down menu 61) may be provided to and stored in a smart process object when that smart process object is placed within or used within a process module 39. This functionality enables the simulation behavior to be customized by the user to thereby provide for better or more accurate simulation. If desired, and as will be described in more detail later, the smart process objects 42 or each process module 39 may include an operator actuatable switch (such as an electronic switch or a flag) that disables the use of the simulation algorithms within the smart process objects and that, instead, causes the behavior of the process module to be determined by a high fidelity simulation package or program, such as one provided by HYSYS. In this case, the smart process object or the process module obtains simulated parameter data from the high fidelity simulation, as opposed to using the simulation algorithms within the smart process objects themselves.

During execution of a graphic display 35 or a process module 39 by the execution engine 48, the engine 48 implements the communications defined by the inputs 54 and outputs 56 to each of the smart process objects in the graphic display 35 or process module 39 and may implement the methods 60 for each of those objects to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that an instance of the smart process object 42*e* has a tag or unique name within the context of the process module with which the smart process object 42*e* is associated and this tag or unique name may be used to provide communications to and from the smart process object 42*e* and may be referenced by the execution engine 48 during runtime. Process module tags should be unique within the control system configuration. This tagging convention enables elements within the process modules 39 to be referenced by elements within others of the process graphic displays 35, process modules 39 and even the control modules 29. Still further, the parameters of the smart process object 42*e* can be simple parameters, such as simple values, structured parameters or smart parameters that know the expected units and attributes associated therewith. Smart parameters can be interpreted and used by the process rules engine or execution engine 48 to assure all signals are being sent in the same units or are converted properly. Smart rules can also be used to turn on and turn off groups of alarms for the smart process objects (or process modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects, when used in process graphic displays or process modules, may also include mode of operation, status, and alarm behavior so that these smart objects may be put in different modes during runtime, such as the off, start-up, and normal modes, may provide a status associated with the object based on its current operating state, and may provide alarms based on detected conditions, such as a parameter out of range, limited, high variability, etc. Smart process objects may also have a class/subclass hierarchy which enables them to be categorized in class libraries, to be collected together in a composite structure, etc. Still further, smart process objects may utilize information from other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, measurements or actuators, control strategies, etc. In some cases, smart process objects may be associated with connectors, such a piping, conduit, wiring, conveyors, or any other device or entity that moves material, electricity, gas, etc. from one point to another point within the process. Smart process objects that are associated with connectors, sometimes referred to herein as smart links or connector elements, are also tagged (even though the actual device or connector itself may not be tagged or able to communicate within the process plant 10), and are generally used to represent material flow between other elements in the process.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects, match and, if not, may perform a conversion. The methods of the smart link may also model the flow through the connector using a model or an algorithm to estimate the speed or nature of the flow through the actual connectors, length and size of the physical connections, transport delay, etc. The stored parameters for the smart process object (such as friction parameters) may be used in these methods. Thus, in essence, the smart links or connector elements enable smart process objects to be aware of the other upstream and downstream objects or entities. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects and to resolve the impact of smart objects associated with output connections.

If desired, the smart process object 42e may also include hot links, such as URLs, to key documentation which may be applicable to the type of object, or which may be specific to the instance (depending on the criticality and application) of the device to which the smart process object 42e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in the an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different smart process objects, they may be created separately. For example, a process graphic may be created using smart process objects and, when completed, a process module for that graphic may be generated based on graphic elements and their interconnections in the graphic display. Alternatively, the process module may be first created using smart process objects and, once created, a graphic display for that process module may be automatically generated by the configuration application 38 using the graphic display elements in the smart process objects used to create the process module. Still further, a process module and a graphic display may be created separately and the individual elements within these two entities may be tied together manually by referencing one another (e.g., using the tag properties of the elements within the graphic display and the process module). Through this mechanism, a smart process object may be referenced by multiple displays. In any event, once created, a process graphic display and an associated process module may be run independently or separately, although they will typically communicate parameters and information back and forth as desired or needed.

Generally speaking, a set of predefined graphic elements may be provided in the configuration application to enable a user to construct process graphic displays that reflect the process plant. These displays have graphic display elements designed to dynamically show on-line measurements and actuators that interface with the control system and, as a result, may present information typically monitored and utilized by operators or other personnel involved in on-line operations. In addition, unmeasured parameters that reflect process operation may be calculated using on-line process simulation provided in the process modules and may be shown as an integral part of the associated graphic displays. In these and other ways, the process graphic displays may provide information typically monitored and utilized by plant personnel other than operators, such as engineering personnel or management.

Additionally, in an offline environment that may be used for engineering or training simulation purposes, the process simulation values provided by the process modules may be used and/or displayed in place of the actual process measurement values otherwise provided by the graphic elements and the associated control modules. These simulation values, which may be calculated by the associated process modules or a third-party simulation application (e.g., HYSYS), may be based on actual plant settings (e.g., an actuator position or state) as well as user-specified disturbance settings or values that may be established via, and depicted in, the process graphic displays and their respective graphic display elements. To these ends, a content layer of the process graphic display customized for an offline view of the process graphic displays may be generated and made available in, for instance, a training context. Further details regarding this content layer of the process graphic display are set forth below.

More generally, the process graphic displays may be used in a variety of contexts involving both on-line or control situations, and off-line or simulation situations, by a number of different types of personnel. To this end, each process graphic display may have a plurality of content layers dedicated to these different contexts, situations and personnel. Unlike past systems having separate, independent displays, these dedicated content layers are integrated portions of the objects used to define them, in the sense that the same object or objects have associated therewith the information necessary to generate all of the different content layers. As a result, the content layers of a single process graphic display provide customized views without requiring a configuration engineer or other design personnel to create a separate display for each of the views.

The breadth of information required to generate customized user interface displays for the different functions (operations, engineering, maintenance, management, etc.) is provided and supported by a flexible and extensible set of graphic display elements and the simulation algorithms associated therewith. These graphic display elements, which may correspond with a number of different types of process plant elements, including stream elements, process connection elements, actuator elements, processing elements, measurement elements and estimated property elements, may be predefined or otherwise made available for use in creating the process graphics display and its broad functionality. Custom elements may also be created or generated by a configuration engineer to cover specific types of the foregoing process plant elements, composites of such elements, and entirely new elements composed from basic graphic shapes (e.g., lines, circles, etc.).

Stream elements generally define a stream of material in the process plant and may be exposed in the graphic display to show the composition, density, flow, temperature, pressure, weight, and/or any other parameters defining the stream of material. Stream elements may be defined at the input of the process module and provided to elements within the process module to thereby enable the flow of material through the process module to be modeled and depicted in the graphic display. Similarly, stream elements may be illustrated at the output or end of the process module to illustrate in the graphic display the material output of the portion of the process plant depicted by the graphic display. Stream elements also may be used to define how different graphic displays (and the associated process modules) are connected with one another. For example, the output stream in one process module may be the input stream in another process module and may supply the values used at the input stream of the other process module. Streams may contain the following four parts: name (e.g., pH stream), direction (e.g., flow input), measurement (e.g., flow, pressure, temperature), and composition (e.g., nitrogen, ammonia, etc.) However, streams could have other parts or parameters if so desired.

Process connection elements define the manner in which materials within the plant, such as solid materials, liquid and vapor, and gases are delivered or carried from one device to another. To clearly illustrate the material flow through the process, three different types of process connections including piping, ducts and conveyors may be used. Of course other connection elements, such as electrical cables to address power flow in electrochemical processes, etc. may be used as well. Piping is generally used to illustrate (and simulate) liquid and high pressure vapor or gas flow within the plant. Ducts are generally used to illustrate (and simulate) low pressure gas flow within the plant. Conveyors are generally used to illustrate (and simulate) the movement of solid material between processing units. As a result, each process connection element defines the type of connection, such as a pipe connection, a duct connection or a conveyor connection that is used to provide material at the input or output of a device.

If desired, the properties of the material that is being transferred by a connection are determined by the upstream input. This information plus a connection status variable defining if the connection is complete may be made available as properties of the connection element on the graphic display. A connection element may start at a processing element output, an actuator element output or a stream element output. In a similar manner, a connection element may terminate at a processing element input, an actuator element input or a stream input.

The properties of a connection element may be automatically displayed when the cursor is placed over the connection element in the graphic display. Also, the properties associated with a connection element may be exposed for permanent display by placing a measurement or estimated property element (defined below) on the connection element. If desired, a connection element may be created by holding the left mouse button down over an element output (such as a stream output, a processing element output or an actuator element output) and, while holding down a button on the mouse, positioning the cursor over an element input. For the connection to be established successfully, the input and the output types (pipe, duct, or conveyor) of the upstream and the downstream elements must match. The connection will automatically take on the type of the upstream element.

If desired, piping elements can be shown or depicted in the process graphic display as a pipe connection, duct elements (e.g., air or gas) can be shown as a duct, and conveyor elements may be shown as conveyor belts. Piping, duct and conveyor element connections can be automatically routed between processing elements and arrows may be displayed outside the depiction of these elements to show the direction of the flow. If an upstream output is common to two connections, then a "T" element may be included in the pipe, duct or conveyor. Similarly, "T" elements may be used to combine multiple outputs. The color or other graphic property of a conveyor element may change to indicate its status, e.g., running/stopped, flowing/not flowing, plugged, etc. Generally speaking, the material flow along a conveyor is determined by the motor drive connected to the conveyor. Thus, a motor drive actuator (which is an actuator element described in more detail below) may be connected to the conveyor. Additionally, measurement elements (described below) can be connected to pipe, duct and conveyor elements to make it possible to expose measurements associated with the pipe, duct or conveyor elements, such as the speed of the conveyor or the flow of material in a pipe or duct, the properties of the material on or in the conveyor, pipe or duct, e.g. moisture or weight. Also, an exposed property element may be added to display properties of the material on or in the pipe, duct or conveyor that are not measured, for example, the composition of the material.

If desired, each of the piping, duct and conveyor connection elements may graphically and dynamically reflect a lost connection (e.g., by a color change), and that a selected property (pressure, temperature, length, etc.) is outside configured limits (e.g., by a color change). Furthermore, parameters calculated by the associated process module may be exposed in the graphic. For example, properties provided by the upstream connection, whether the connection status is bad or good, limits on one or more selected parameters of the connection element, etc. may be exposed in the graphic display to provide information to the operator about the connection element or the stream being transferred by the connection element.

Generally speaking, actuator elements are elements that perform some actuation function with respect to the stream and may be placed between different connection elements or between a processing element and a connection element. Examples of actuator elements include a regulating valve (with actuator), an on-off valve (with actuator), a pump (with motor), a force draft fan (with motor), an induced draft fan (with motor), an eductor (with on-off valve), a damper (with drive), a feeder (with variable speed motor), a conveyor motor drive (which may be attached to a conveyor element), etc.

The graphic depiction of the valve elements may dynamically reflect the implied valve position (by animation, for example), valve failure (by a color change, for example), the valve full open/closed position (by a color change, for example), and the AO, DO, DC, setpoint, PV, OUT, mode, etc. (by a numeric string or other indication, for example) of the associated control block controlling that valve. The simulation element associated with the valve elements (used in the process module) may have simulation algorithms that calculate parameters associated with the valve actuator, such as the discharge pressure, mass flow, liquid temperature, liquid composition, inlet pressure, and outlet pressure. These simulated or calculated parameters may be exposed in the process graphic, if so desired. However, the user or configuration engineer must usually configure the reference to an AO, DO or DC block in a control module associated with the valve as well as the valve type (e.g., linear, quick opening, equal percentage, valve sizing, etc.) and the stroke time from open to close. Of course, the simulation algorithms available to simulate the operation of the valve on the material flowing through the valve may be dependent upon the type of the valve and sizing information.

The graphic depiction of pump elements may dynamically reflect the motor status (using, for example, a color change), the associated DO or DC function block mode and setpoint (using, for example, strings), the motor speed (if variable speed drive is used), the AO setpoint, PV, OUT mode (if variable speed drive is used) and other desired parameters. Likewise, the process simulation (used in the process module) for this element may determine or calculate parameters such as the discharge pressure, liquid composition, liquid temperature, and mass flow, which parameters may be exposed in the graphic display. The user may need to define a pump curve based on the pump type. However, the user may configure the reference to the DO or DC block associated with the motor start/stop, the reference to the associated AO function block for variable speed drive (if used), and the pump curve (e.g., pressure versus flow) for the defining the operation of the pump.

The graphic depiction of a force draft or an induced fan actuator element may have a depiction that dynamically reflects the motor status, DO or DC function block mode and setpoint, motor speed (if variable speed drive is used), the AO setpoint, PV, OUT, DO or DC function block mode (if variable speed drive is used) and other desired parameters, any of which may be exposed in the graphic display. The process simulation element (used in a process module) for this element may determine or calculate parameters such as the discharge pressure, gas composition, gas temperature, and gas mass flow, which parameters may be exposed in the graphic display. The user may configure the reference to the associated DC block for motor start/stop, the reference to an AO block for variable speed drive (if used), and the fan curve (pressure versus flow) for defining the simulated operation of the fan.

Processing elements include plant equipment that processes the materials or streams in the plant in some manner. Generally speaking, all inputs and outputs to and from processing elements will be made through connection elements. Standard processing elements include tanks (vertical and horizontal), heaters, static mixers, reactors, mixers, air heaters and any other elements that perform some type of simple or standard processing activity. For standard processing elements, the user may specify the number of inputs and outputs to the element along with the physical equipment properties e.g. size, volume, etc. The simulation algorithm and static representation of these standard processing elements may be set so that they cannot be modified by the user but may be selectable as described above at configuration time. Of course, if desired, other, typically more complex plant equipment (such as distillation columns, evaporators, separators, boilers, etc.) may be implemented as custom processing elements. The static representation, number of inputs and outputs and the simulation algorithm of such custom processing elements may be modified to meet the user interface requirements. Once a custom processing element has been defined, it may be saved as a composite or template that may be reused or used as a starting point in the creation of other processing elements.

The tank standard processing element (either vertical or horizontal) may be configured based on the pipe connections to the tank and the tank element may dynamically reflect the level in the tank (using, e.g., dynamic animation), and the level at 100% or empty (using a color change, for example). The process module simulation for the tank may calculate and expose, via the graphic display, parameters such as the outlet temperature, the outlet composition, the liquid temperature and the simulated level of the tank. However, to tie the tank into the system, the user or configuration engineer may need to configure the number of input and output connections, the complete connections to the tank, the tank properties, such as size (e.g., diameter and height), etc.

The heater processing element may dynamically calculate and reflect, via the graphic display, the heat transfer coefficient (e.g., using a color change), the outlet product temperature, the inlet product temperature, the outlet pressure (assuming fixed drop), etc. A user or configuration engineer may need to configure the complete connections to the heater, the heater surface area and the heat transfer coefficient when clean.

Of course, other processing elements such as a static mixer, a reactor, a mixer, an air heater, a heat exchanger, etc. may have display and simulation capabilities that are tailored to these types of devices. Non-standard processing elements, such as distillation columns, evaporators, separators, boilers, etc. may be represented graphically using a custom processing element in which the simulation associated with the vessel may be user defined if not included in a standard selection. The processing in these elements may be described or defined as a step response model relating each input to each output of the vessel. Inputs may be gas and/or liquid streams. Optionally, the user may define the equations that describe the relationships between the inputs and outputs of the processing element and these equations may be stored in the process module using that element to perform simulation. If desired, some simple static graph representations may be provided to help the user quickly create the static graphics associated with a custom processing element. If these simple graphics are used, then the user may need to only specify the desired number of input and output connections and the type of connection supported (e.g., pipe, duct, or conveyor) supported by the custom processing element. In response, the graphic item will be displayed and can be immediately used in the creation of the operator graphic. If desired, the gains and any dynamics associated with each input and output of the process element may be specified if the user elects to specify the simulation algorithm as step responses. If the user selects a custom algorithm, then an expression editor may be provided for the user to define the simulation algorithm. Based on the method selected, the properties of the custom processing element outputs may be calculated differently. Furthermore, the user may reference one or more of the algorithms that they have defined in a separate software assembly.

Additionally, several pre-defined composites or templates may be provided for creating custom processing elements. These templates may include, for example, a boiler template having a custom algorithm that calculates the exit gas $O_2$, the exit gas CO, the steam generated, the boiler drum level and the boiler draft. Such a template may be based on a single fuel input. However, by modifying the template, it is possible to simulate boilers with multiple fuels. Other pre-defined templates may include a specialized vessel-cyclone separator template, which may be used with in conjunction with a spray dryer custom processing element, and which may include a step response model to model the operation of the separator. Likewise, a column template, a spray dryer, and an evaporator body may utilize a step response model to define the expected process response. In an evaporator, based on the energy input and the concentration of the input flow, the concentration of the outlet flow and vapor release can be calculated. Multiple evaporator elements may be connected together along with heat exchanger and eductor elements to create a multiple-effect evaporator. Similarly, a specialized vessel-stack custom template processing element may be used with the boiler processing element. In this case, the properties of the inlet may be carried through the stack with no modifications if so desired, or to reflect emissions reductions performed in the stack.

Other types of elements that can be used to create process graphic displays and process modules include measurement elements and property elements. Measurement elements include transmitter elements, which may be used in the graphic display to access the measurement value associated with a physical transmitter, and switch elements. Generally, the transmitter element may dynamically reflect bad or uncertain status, the mode of the associated AI function block in the control module, the measurement value and units, etc. associated with an actual transmitter (sensor) or other data associated with the actual transmitter. In an off-line mode (or simulation mode) the transmitter element may be used to access and display the simulation value provided by the process module rather than the value associated with the AI or PCI block or may be used to provide a measurement value to the associated AI block in the control module as a measurement to be used in the simulated control routine. The transmitter element can be added to a connection element or to a processing element and, when such a transmitter element is added to the display, the user will generally need to identify the associated AI, PCI or DI block in controller scheme that is providing the measurement. In the on-line mode, the value of the measurement may be shown next to this measurement element. In the off-line mode (or simulation mode) the simulated value of the measurement (as developed by the corresponding process module) may be automatically displayed. In on-line operation, the user can elect to switch control and display to the simulated value in the event of a measurement failure.

A switch element may dynamically reflect a bad or uncertain status, the mode of the associated DI (e.g., manual or OS), and the discrete value of a switch (on, off, etc.) When in an off-line simulation mode, the user may use the switch display element to access and change the switch parameters in the graphic display and control module by selecting a simulation value or a manual value and status and by manually entering the value and status of the switch. However, a user may generally configure the switch element by providing a reference to an associated DI block in the control scheme, a reference to the element property that triggers the switch, and the limit and deadband associated with a change of state of the switch.

An estimated property element generally exposes an estimated property of the system as determined by the process module and may be added to a connection or processing element to display any property of that element. When this element is placed on a connection element or on a piece of equipment, the user can browse and select the properties that will be displayed. Thus, simulated properties that are not available through a physical measurement may be exposed through the use of the estimated properties element. Such an estimated property element may dynamically reflect a good/bad connection, the estimated property value(s), and a property that is outside of an associated limit or change. A user must generally configure the reference to property(s) to be displayed and the limits and color changes for the element if the property is outside of the limits.

As will be understood, by attaching transmitter elements and estimated property elements to processing elements, actuator elements and connection elements, the properties associated with the inputs and outputs of these process plant elements may be referenced during on-line operation or off-line simulation. These properties may also be made visible in the process graphic display.

II. Efficient Presentation of Functions and Modules in Applications

Figure 3:
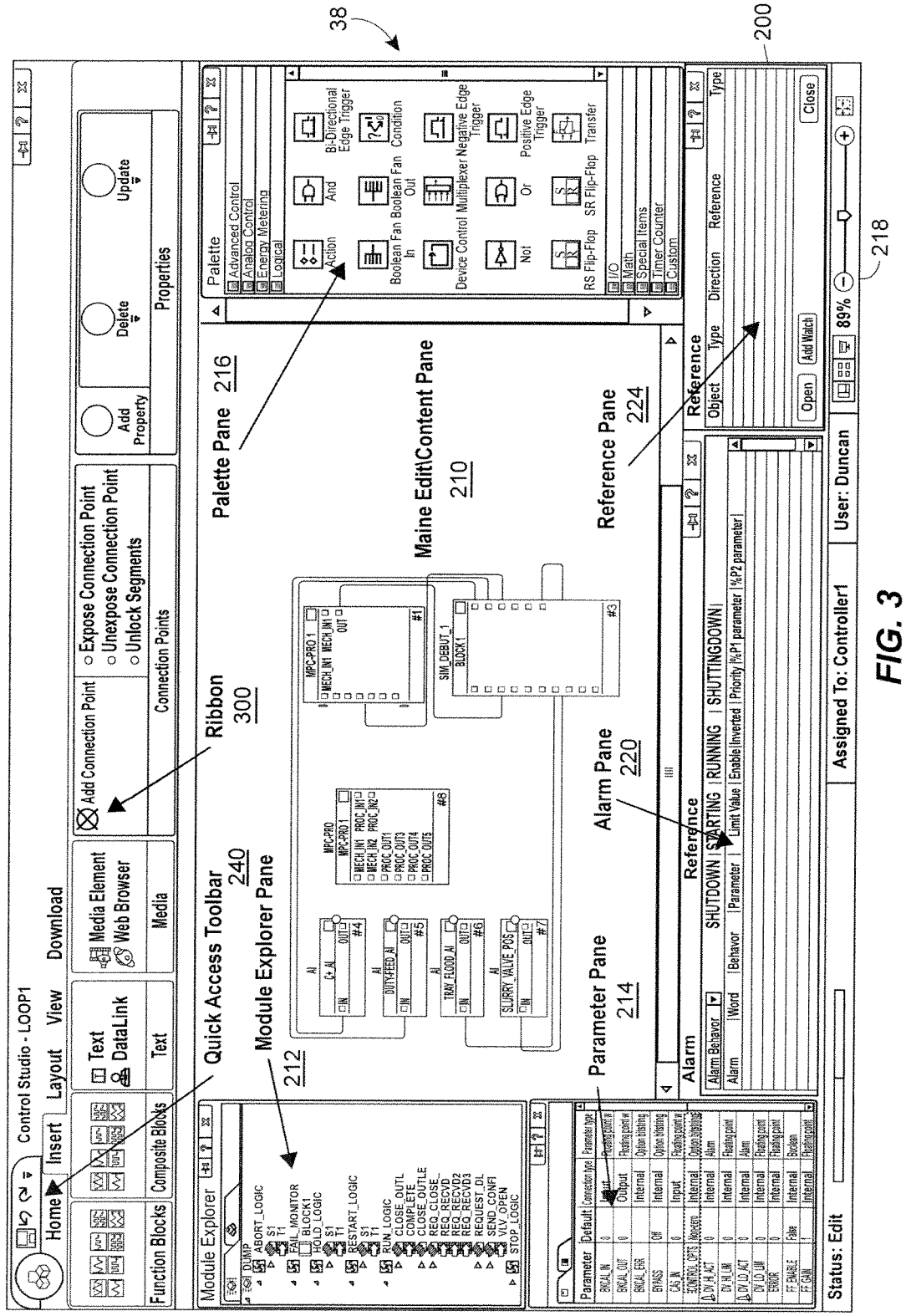
FIG. 3 is an example of a main user interface window of a software module for designing and simulating control logic to be used in the process control environment depicted in FIG. 1.

Referring to FIG. 3, the user interface of the graphic display configuration applications 38 (e.g., control studio application 38A, explorer application 38B) may include a main window 200 with several panes for organizing functionality related to process configuration, recipe design, etc. More specifically, the main window 200 may include a main content or editor pane 210, a navigation or module explorer pane 212, a parameter pane 214, a palette pane 216, a pan and zoom pane 218, an alarm pane 220, an action pane 222, a reference pane 224, a watch pane, a formula pane, a multi-mode selection pane, etc. Further, some or all of the generations of the window 200 may include command pane such as a ribbon-style menu 300, also referred to as "ribbon 300" in a more detailed discussion below.

In at least some of the embodiments, the supported window panes can be toggled on and off, undocked, resized, and floated or moved anywhere on the desktop to enable a user to customize the engineering environment and achieve a better efficiency. In particular, floating panes outside the main application frame allows users to have more "real estate" for the main content or edit pane 210 when viewing or modifying larger modules.

The reference pane 224 may depict all references (e.g., reads, writes) for the current module or recipe in the configuration application. Generally speaking, the reference pane 224 lists control references and global variables within a display in a logical and user-friendly manner, and supports filtering and sorting options to improve user experience. For example, references may be sorted or filtered according to module name, unit, process cell, area, etc. In response to a user command or according to a pre-stored setting, the reference list may be condensed to show the module name only or the complete module path. The control reference list may also identify invalid references (e.g., references that do not exist in the database). The reference pane 224 can also be used to list global variables that are contained in the main content pane 210 or another display being currently edited.

In operation, user opens the reference pane 224 to view the references associated with an object. In an embodiment, the reference pane 224 includes an interactive table in which a module or graphic object being analyzed or edited is listed in a left column, and a right column lists references that are external to the module or graphic (e.g., a datalink) being edited. Further, a column "reference conditions" may list reference conditions such as "bad" if the reference does not exist or cannot be resolved for other reasons. Still further, another column may list a comment or suggestion regarding possible reasons why the reference is "bad" such as, for example, unavailability of a database.

Additionally or alternatively, the reference pane 224 can also include a "reference status" column to indicate, for example, error state of I/O, device, or alert status of the reference in run time. In at least some embodiments, the "reference condition" and "reference status" columns are presented in the reference pane 224 only when a run-time database is available to be used for comparison. In this manner, generation of the reference pane 224 does not adversely affect system performance.

If desired, the reference pane 224 also can be used to preview animations. For example, a reference object in the reference pane 224 may be selected and "simulated" values could be entered to enable testing the configured animation without using a database. In this manner, the user need not launch a dedicated application or a pane to test object animation.

Further, sorting of entries in the reference pane 224 may be accessible via "up" and "down" arrow controls will allow column sorting. Still further, when a user selects an expression in the reference pane 224, the user interface preferably highlights the corresponding object within the navigation pane 212. In an embodiment, references listed in the reference pane 224 are exportable to another application such as Excel, for example.

Generally with respect to references, the control studio application 38A and/or the explorer application 38B may support references lists for device signal (I/O) tags to display lists of "reads" and "writes" from function blocks and expressions; plant areas, process cells, unit modules in relation to node assignments in batch execution modules and historian modules; and all devices and device templates in a particular library, for example. Further, a control module referenced by an alias may include the alias as a reference, so that a user can identify the alias by right-clicking on the module in the main content pane 210, by "hovering" over the control module, or in any other desired manner.

With continued reference to FIG. 3, the parameter pane 214 may support edit-in-place so that the user does not have to launch another dialogue or access another menu item to modify parameters. Further, parameter pane 214 may support editing of graphic object parameters and provide access to object animations. Still further, the parameter pane 214 may allow the user to modify both static and dynamic (animation) properties of a selected object.

As discussed in more detail below, a user can save one or several default layouts. Each layout may include, for example, a set of panes, the size of each pane in the set, filter settings, and location of each of the panes. Further, the user may assign a custom name by activating an appropriate control (e.g., a button, a dialogue, etc.)

In another aspect, the user interface 38 may support a quick access toolbar 240 to allow a user to customize his or her environment by creating easily accessible shortcuts for common tasks. In an embodiment, the quick access toolbar 240 may include a default set of commonly used commands such as save, undo, redo, etc. that the user may expand or reduce as desired. In some embodiment, the user interface 38 includes an option to display the quick access toolbar 240 above or below the ribbon 300.

Further, the user interface 38 may remove all visual indications related to unlicensed or unpaid-for functionality. For example, if the software module cannot find or authenticate a license for configuring and executing process batches in the suite of operator interface applications 32, the user interface 38 may hide all batch functionality and options from the user to avoid confusing the user with irrelevant options and cluttering the screen 200.

The user interface 38 may also provide a "view" option to determine if the panes of the main content window 200 should be displayed in a tile/windowed, tabbed, or another view. The user interface 38 may limit the number of windows or panes to be displayed in this view to four, for example. Users may also have the ability to substitute additional objects in each of these windows.

In an embodiment, the navigation pane 212 of each of the control studio application 38A and the explorer application 38B may display a similar module explorer window. FIG. 4 illustrates two examples 310 and 312 of a "classic" hierarchical navigation pane that uses two windows for vertical and horizontal navigation, and FIG. 5 illustrates phase logic module and recipe panes 320 and 322, respectively, each consistent with the teachings of the present disclosure. In the example of FIG. 5, arrows are used for navigation and expanding selections. Clicking on items sets focus on objects already contained in the main content or edit pane 210 or "drills down" into a composite or other configuration item contained in the hierarchy. This feature improves the speed of use by making it easier for configuration engineers to navigate the module, set the desired focus, and access objects to make configuration changes. Moreover, this feature also facilitates the important enhancement of drilling down into phases from a recipe level.

As illustrated in FIG. 5, the navigation pane 212 may support several tabs to separate physical and logical items displayed in the hierarchical structure (e.g., a tree) according to how relevant these physical and logical items are to the information displayed in the main content/edit pane 210 or another pane. For example, the navigation pane 212 in FIG. 5 includes an "open modules" tab (depicted on the left) that lists objects being edited in the main content pane 210. As discussed in more detail below, the user interface of the applications 38A and 38B may also support multiple panes of the same type, such as edit panes 210. In these embodiments, the "open modules" tab may list all objects being edited in every edit pane.

By contrast, the "all modules" tab of the navigation pane 212 (depicted on the right) may display all existing configured items that can be utilized in the current module or recipe. Thus, in effect, the "open modules" tab serves as a filter to select a subset of available items. Because the number of items in a typical process control system can be very large, the two-tab approach allows users to efficiently identify relevant items in the navigation pane 212 to view the relationship of these items to the rest of the structure, for example.

Further, navigation pane 212 can provide other types of filtering such as context-based filtering. When a configuration engineer develops a recipe, for example, the navigation pane 212 can list objects relevant to this particular recipe in a separate tab. As a more specific example, if the configuration engineer is defining an operation of a recipe, the list of items in one of the tabs could include the phase classes that could be added to the recipe as steps, and not include phase classes that cannot be added to the recipe. Meanwhile, the "all modules" tab can list all phase classes available in the corresponding database.

Figure 6:
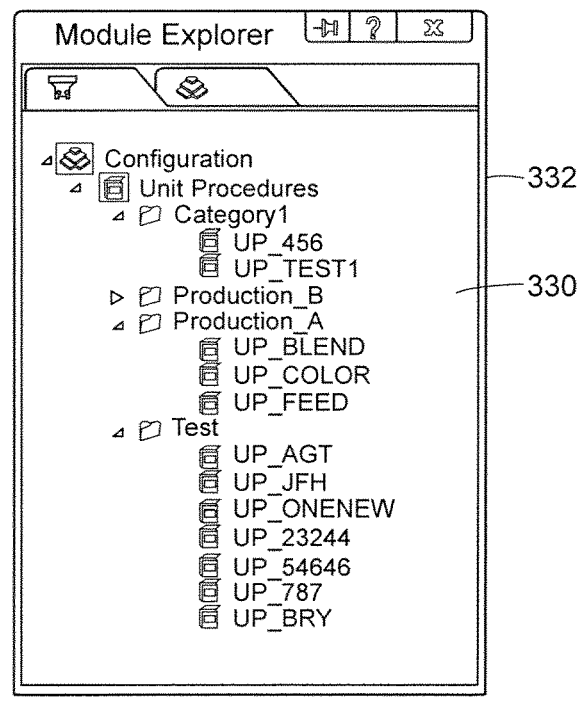
FIGS. 6 and 7 illustrate several examples of a configuration tab generated by the user interface of the system illustrated in FIG. 1.

It will be appreciated that the presenting the navigation pane 212 as two or more tabs reduces the number of clicks or other actions the user has to perform. In other words, the user may be able to skip the drag-and-drop the step, assign/browse to the existing configuration item, etc. FIG. 6 illustrates a configuration tab 330 in a module explorer window 332 in the context of a recipe procedure. The configuration tab 330 enables the user to add existing unit procedures to the corresponding diagram.

Figure 7:
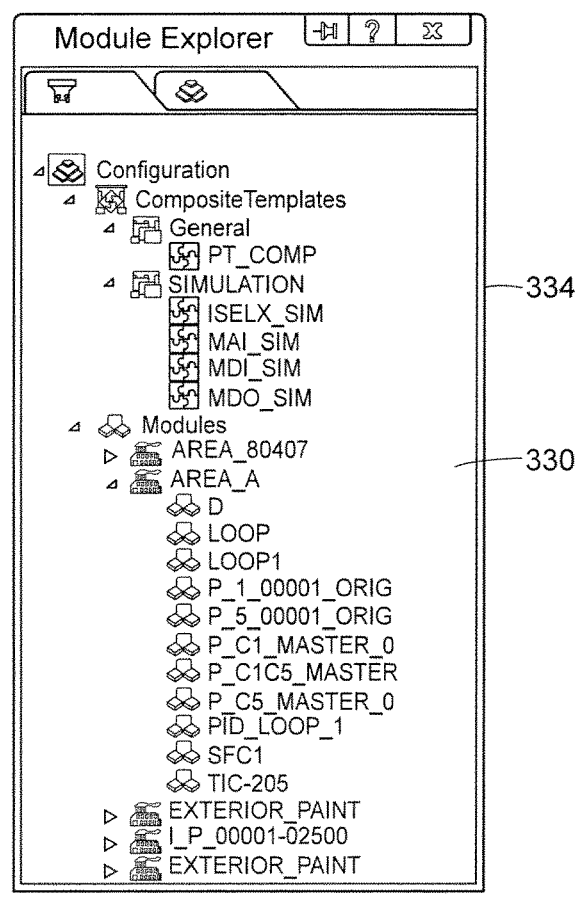

The existing configuration section may contain composites and modules to reduce the number of clicks required to add a composite or module block to the open module. Rather than having to navigate through the insert custom block "classic" option, the user can drag and drop the item directly into the module. FIG. 7 illustrates an example of the configuration tab 330 in another module explorer window 334 when a module is open in an overall control application which may referred to a control studio, for example.

Figure 8:
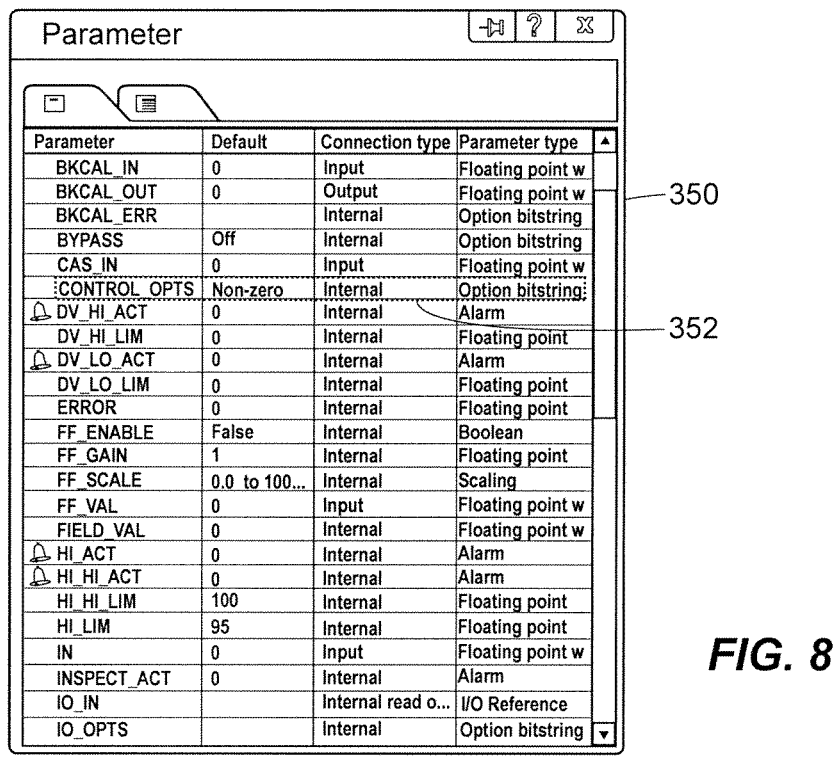
FIG. 8 illustrates an example parameter window which may be generated by the user interface of the system illustrated in FIG. 1.
Figure 9:
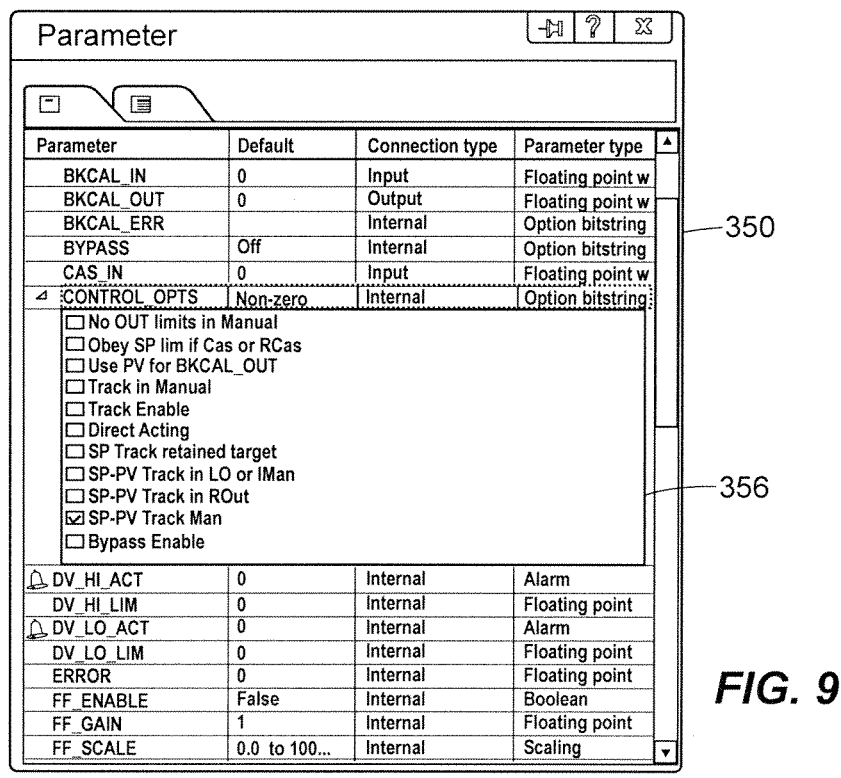
FIG. 9 illustrates an example state of the parameter window of FIG. 8 in which a user selects one of the parameters for editing.

FIGS. 8 and 9 illustrate one possible embodiment of a parameter pane 350 consistent with the present disclosure. In order to reduce the number of selections, clicks, and related dialogs for parameters that the user interface 38 does not allow to associated with values by direct typing, the pane 350 may expand to support making the configuration change within the same window, as opposed to launching a separate dialog, for example. Thus, the user may click on the control options row 352 for a PID block in edit mode. Whereas a typical known system would launch a separate dialog window in this or a similar situation, a section 356 the parameter pane 350 of the present disclosure may expand in response to the click or another event indicative of the user's selection. The expanded section 356 may accordingly allow the user to select one or several options, as illustrated in FIG. 9.

Additionally, the user interface 38 may integrate parameter filtering capability into the ribbon 300 instead of the checkboxes used by some of the known applications.

Figures 10, 11:
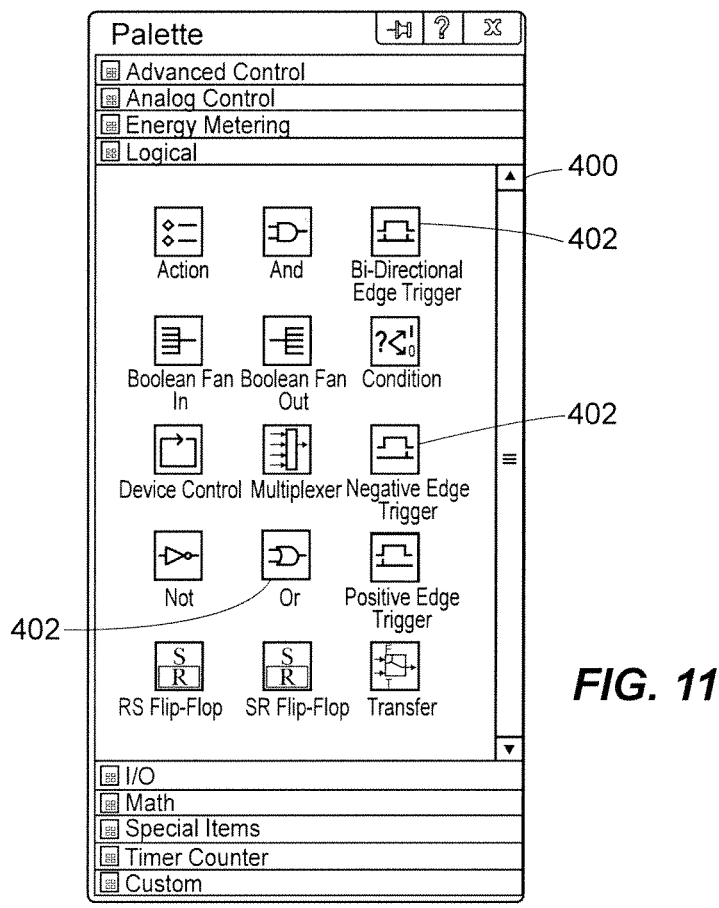
FIG. 10 is another state of the parameter window of FIG. 8.
FIG. 11 illustrates an example palette for use in configuring process control logic with the user interface of the system illustrated in FIG. 1.

FIG. 10 illustrates the edit-in-place feature of the parameter pane 350 illustrated in FIGS. 8 and 9. In this example, the pane 350 may support dragging and dropping parameters to facilitate parameter deferral. FIG. 10 illustrates one possible embodiment of the parameter pane 350 with recipe parameters.

III. Moving and Adjusting Panes

In some embodiments, panes are initially docked in a default location on the desktop. The user can click on the title bar of a desired pane to activate a menu providing, among other options, a floating control allowing the pane to be moved ("floated") to a different location. The title bar of each docked pane may contain the pane name, a control to activate auto-hiding, and a control to close the pane. Once converted to a floating pane via the floating control, a pane can "auto-dock" to edges of other panes, dragged outside the edit workspace, etc. In at least some of the embodiments, both docked and floating can be resized. When a docked Pane is resized, the user interface of the studio application 38A or the explorer application 38B may automatically resize one or several adjoining docked panes so that the contents of every panes are still visible. If necessary, the user interface may also adjust the size of text fonts used in the pane (e.g., reduce the size from nine to eight).

In an embodiment, the user interface of the configuration applications 38 can also allow panes to be located outside the main application window. This feature provides more uncluttered space to design control strategies or graphics, or perform other engineering tasks. Further, the user interface of the configuration applications 38 can support the auto-hide feature to hide docked panes, showing only the name of the pane title bar. A user can activate this feature by clicking on a dedicated button disposed on the title bar of a docked pane, for example. When a hidden pane is re-activated, the title bar can resume a horizontal alignment. If desired, hidden panes may be positioned similarly to other docked panes.

IV. Customizing and Saving Layouts

Users can activate some of the features discussed herein to select or define filters to be applied to the navigational pane 212, select controls to be displayed in the command pane 300, position, resize, stack, group and otherwise adjust panes as desired, select font sizes, colors, background, and other text or graphic attributes, and perform further adjustments. to define a work environment convenient and intuitive to the particular user. The user interface may further allow users to customize at least some of placement, sizing, filtering, grouping, and stacking of columns in the main content area to define custom column layouts. As indicated above, users can also customize the quick access toolbar 240. The user may then save the defined configuration and restore the saved configuration as desired. In some embodiments, the user interface may automatically save the configuration upon logout or another event to allow the user to later restore the preferred layout.

Thus, a certain user may work primarily in the area "A" of a process plant, and may not wish to clutter his or her workspace with data related to areas "B" and "C," for example. The user may accordingly save the layout, filters, and other preferences specifically tailed for working with the area "A." As another example, a user may be interested primarily in control strategies and not interested in individual physical devices, and may accordingly save a filter and layout adjusted for viewing and editing logical entities such as function block diagrams, ladder diagrams, etc. Moreover, some users may have several roles and accordingly may define several custom layouts for different modes of operation.

V. Palette Pane in a Configuration Application

FIG. 11 illustrates one possible embodiment of a palette pane 400. In this example, the palette pane 400 includes icons 402 for various elements used in designing logic diagrams or procedures. Each icon 402 may include an intuitive visual cue regarding the corresponding function (e.g., a common gate symbol for Boolean "or") and, in some embodiments, may include a textual identifier. The user may select the desired icons 402 using any pointing device (e.g., a mouse) and drag the selected item onto the canvass area of the content or edit pane 210. By default, the user interface 38 may create a custom or user-specific category in the palette 400 to expose the feature to configuration engineers. In this manner, configuration engineers need not access the feature through one or several menus. More, a user can add additional items (e.g., by dragging and dropping) to the custom palette to create her own repository of commonly used configuration objects. The user can additionally rename the category, if desired.

VI. Zoom Feature in the Configuration Application

Figure 12:
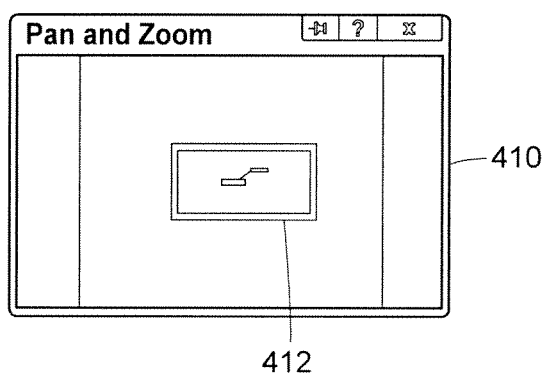
FIG. 12 illustrates an example embodiment of the zoom feature of the user interface of the system illustrated in FIG. 1.

Referring back to FIG. 3, the pan and zoom pane 218 improves the overall ease of use of the user interface 38 by allowing users to better navigate corresponding diagrams when working with large and/or complex modules and recipes. As illustrated in FIG. 12, the pane 410 may include an object or a collection of objects 412 that may be enlarged or reduced in size. The objects 412 may represent, for example, interconnected field devices in a process plant, function blocks of a control scheme using a Fieldbus protocol, phases of a recipe procedure or operation, etc. In some of these embodiments, the zoom function may be a slide bar so that the user may easily select the desired size of graphics presented in the main pane. Further, the user interface 38 may enlarge or reduce the graphics displayed in the main pane 210 in real time as the user operates the zoom control. Thus, the user need not enter a target enlarge percentage to see whether the selected size is satisfactory as is common in most software applications.

VII. Expression Editor

Figure 13:
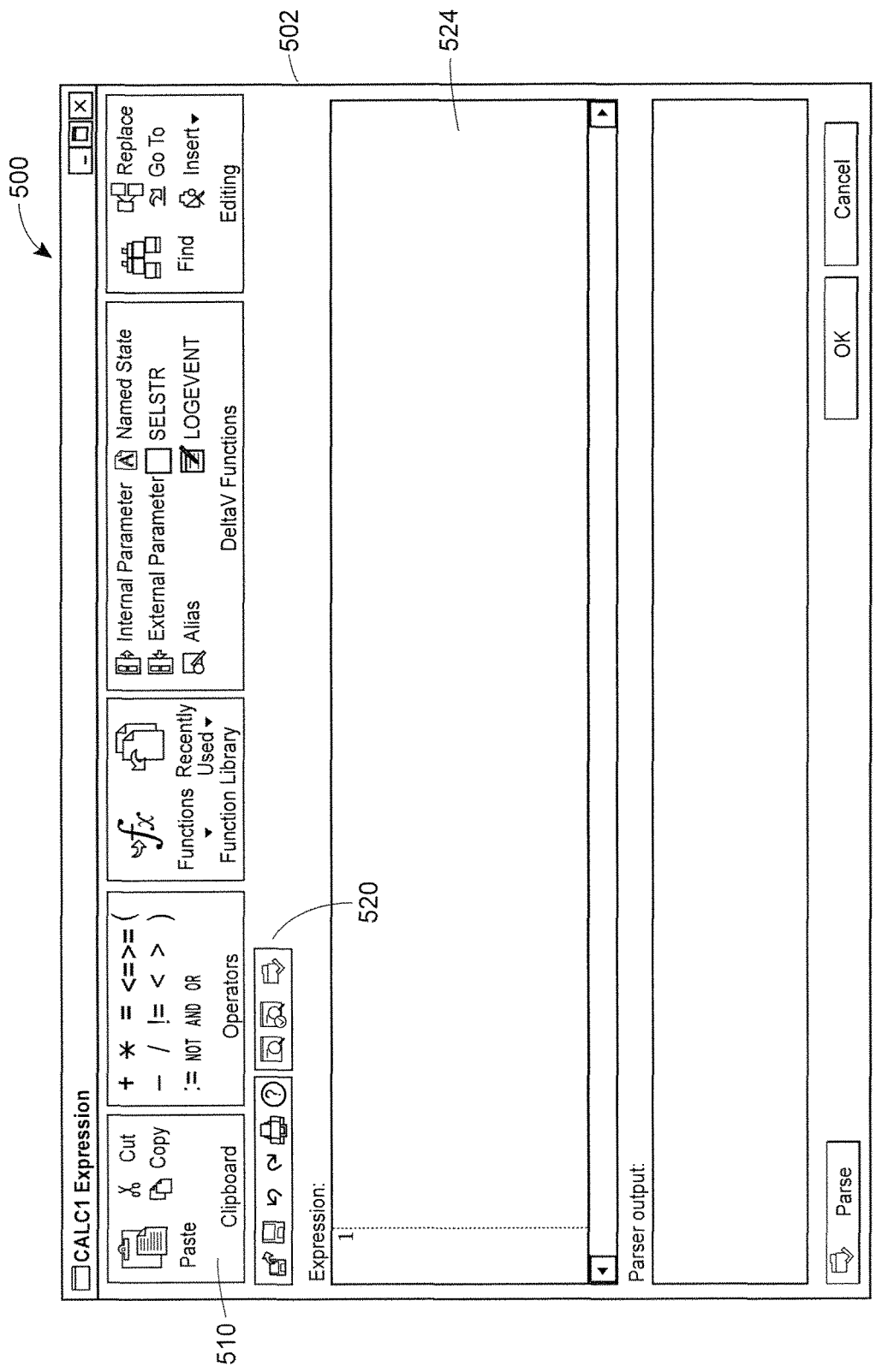
FIGS. 13, 14, and 15 illustrate several example screens of an expression editor which may be included in the user interface of the system illustrated in FIG. 1.
Figure 14:
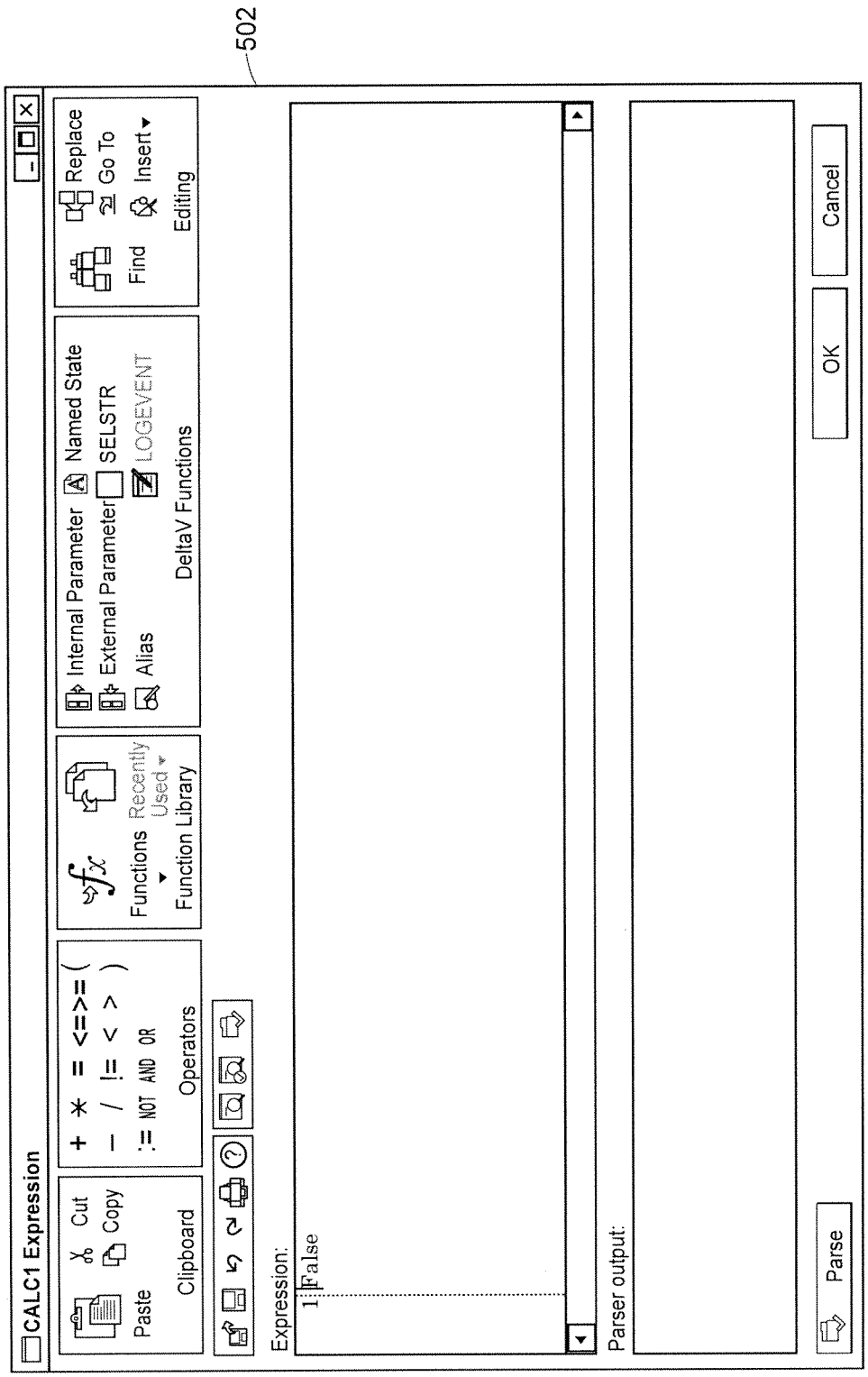
Figure 15:
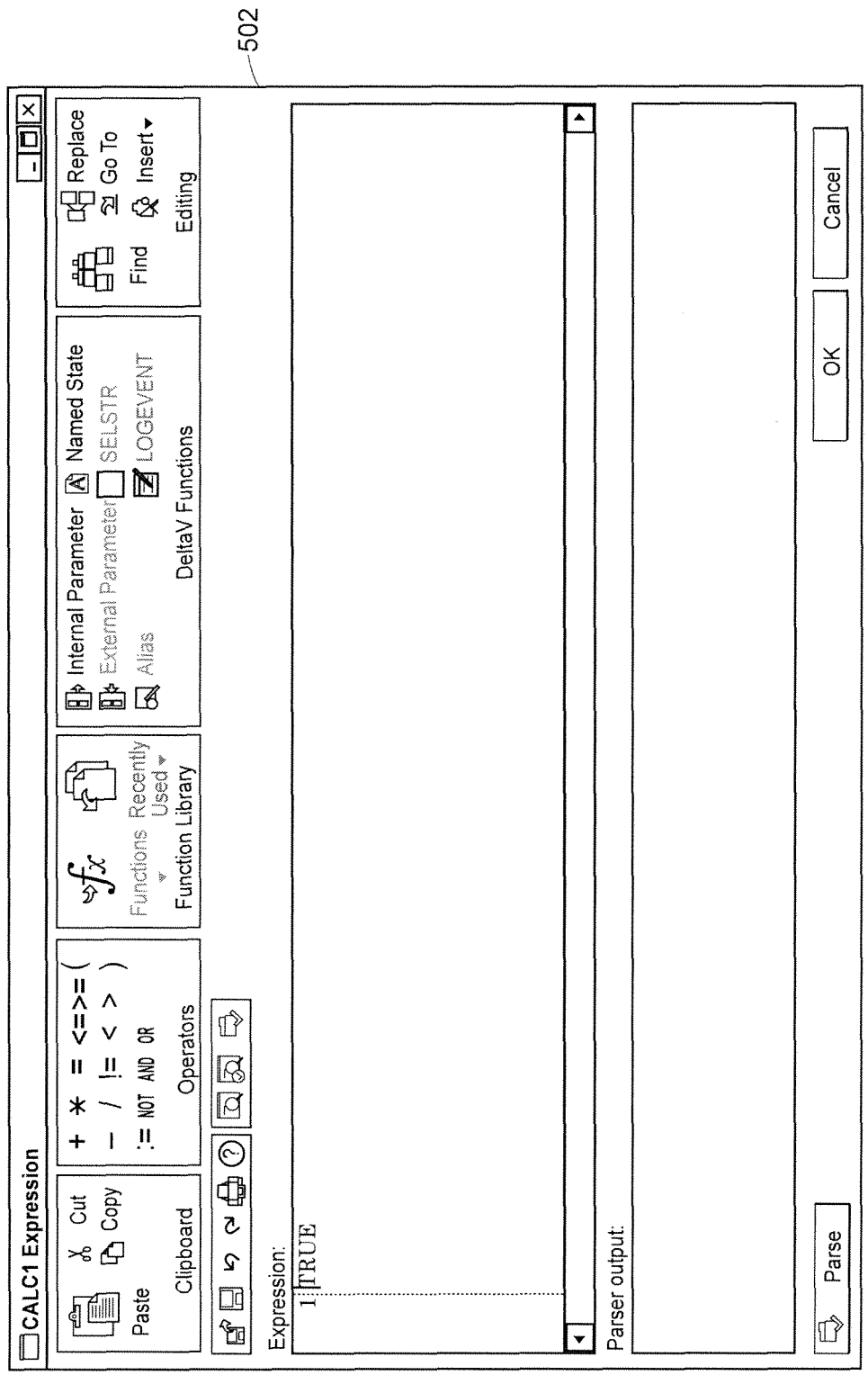
Figure 16:
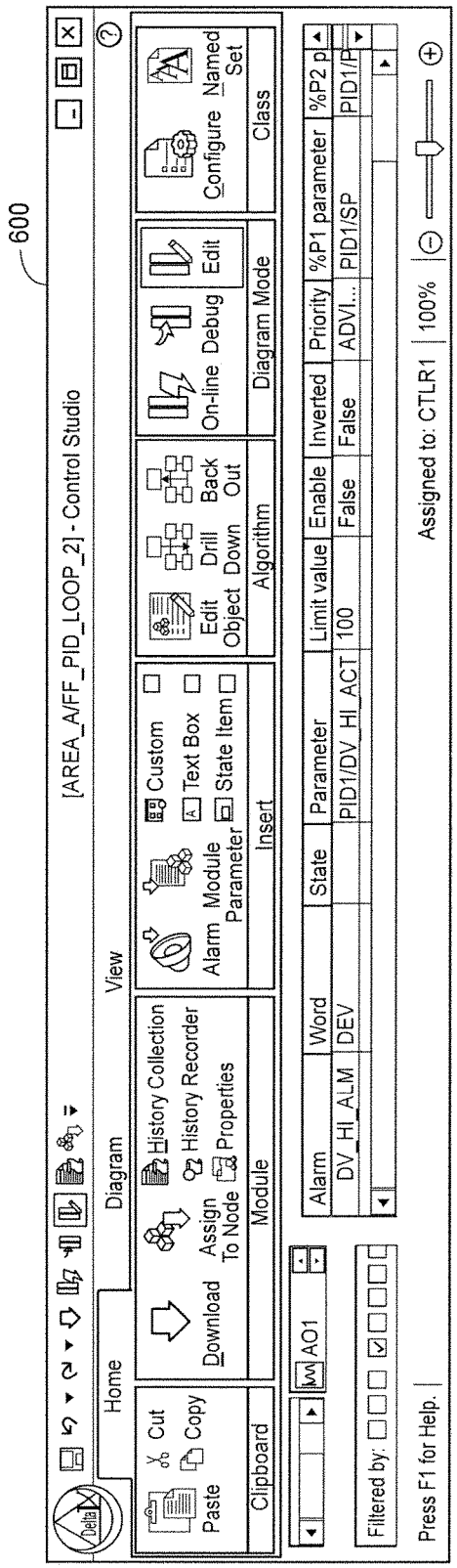
FIG. 16-24 illustrate several example operational states of a ribbon menu generated by the user interface of the system illustrated in FIG. 1.

FIG. 13-15 illustrate an expression editor 500 having an expression editor window 502 optimized for interaction between users and the control studio application 38B, although other applications of the expression editor 500 are also possible. The expression editor 500 may support multiple operational modes such as edit, debug, etc., and the expression editor window 502 may adapt an expression editor toolbar 510 according to the currently selected mode. In an embodiment, the expression editor window 502 is a single application window launched from a master application that supports an enterprise view application and an explorer application, to take several examples. The appearance and behavior of the structured text editor is preferably the same for all locations in which expressions can be modified. The window 502 in FIG. 13 illustrates one possible general layout for the expression editor 500 in edit mode.

The expression editor toolbar 510 may allow a user to insert any applicable structured text (e.g., functions, constants, operands, etc.) in an intuitive manner. The functions and operands may include mathematical operands, Boolean expressions, and other constructs. In an embodiment, the toolbar 510 does not enable selections that are impossible or unavailable in a given context. Thus, the expression editor toolbar 510 of FIG. 13, for example, displays only those options and controls that the user can legitimately invoke in the given mode and at the current stage of operation.

As indicated above, functions and commands may be grouped in a logical fashion. The examples illustrated in FIGS. 13-15 illustrate some possible arrangements of toolbar 510. Further, a quick access toolbar 520 may always provide shortcuts to the following general commands: open, save, undo, redo, print, font, comment, etc. Preferably, the user has the ability to add any command accessible in the expression editor 500 to the quick access toolbar 520 for improved efficiency and ease-of-use.

Additionally, the expression editor 500 may support intelligent (e.g., IntelliSense) typing recognition. For example, when a parameter name is followed by a period, the expression editor 500 may present a drop-down box of possible selections to increase coding efficiency. Additionally, the expression editor 500 preferably supports find and search/replace functionality.

In an embodiment, the expression editor 500 supports code snippets to facilitate easily insertion and reuse of common code. Using this feature, a user can select a section of code in the edit window 524 and save the selection as a snippet with a custom name. The toolbar 510 may include a command for the insert snippet command to allow users to select from the saved set of snippets. In some embodiments, the set of snippets may appear in a dynamic portion of the toolbar 510 as a "gallery" for quick visual selection.

In some embodiments, when the user types a function or selects it from the toolbar 510, the correct syntax automatically appears in the editor window 524 with placeholders for configurable items. The option to "auto-paste" syntax may be a user-selectable option, preferably active by default. Additionally, the expression editor 500 may provide context-sensitive help for all commands and functions.

When the expression editor 500 is in the debug mode, a verify expression window may change into a watch window. By default, all the values of function block inputs, outputs, referenced parameters and local variables in the watch window may acquire current values, preferably with option to remove one or more selected values.

Further, when the expression editor 500 is in the debug mode, the toolbar 510 may automatically change to support debugging operations. For example, the controls for the following debug commands/operations may appear on the toolbar 510: single step, toggle break point (with a support for multiple break points), run to break point, run once, run from beginning, reset/quit, pause execution, etc.

When a user places the mouse over a parameter, the current value may be displayed in a hover fashion above the parameter. Once a hover popup is present, the user can force the value if desired. The appearance of the hover window may also give a visual indication that the value is forced. Further, the hover pop-up may display a subset of the available properties, parameters or controls. The subset may be selected based on the likelihood that a user will selecting a particular property, parameter, or control.

Additionally, the expression editor 500 may indicate the current program location and execution path through the code by highlighting the lines that have been executed. It will be appreciated that this feature may be useful for expressions that contain complex conditional logic. In another aspect, changing to edit mode from online mode should provide the option to remove or preserve break points VIII. Examples of Context-Specific Command Presentation in the Command Pane FIGS. 16-24 illustrate additional examples of the command pane, implemented as the ribbon 300, in various operational states. In particular, the operational state 602 illustrated in FIG. 16 corresponds to a selection of the "home" tab in a context where clipboard functions are unavailable, to take one example. Meanwhile, the user interface 38 may have determined that the context could require various operations associated with the diagram mode.

Figure 17:
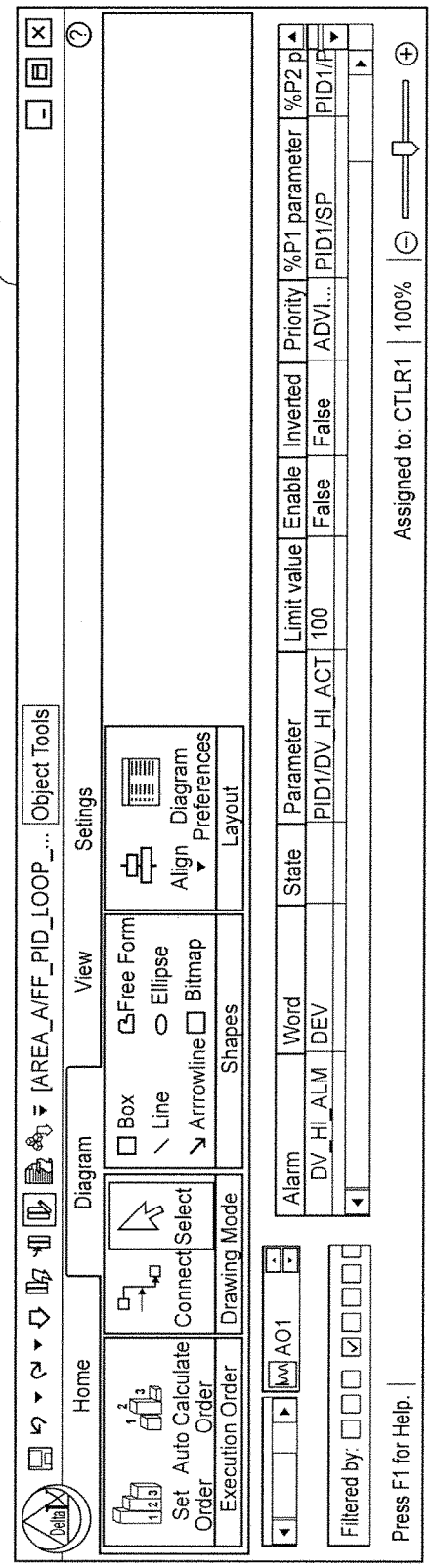
Figure 18:
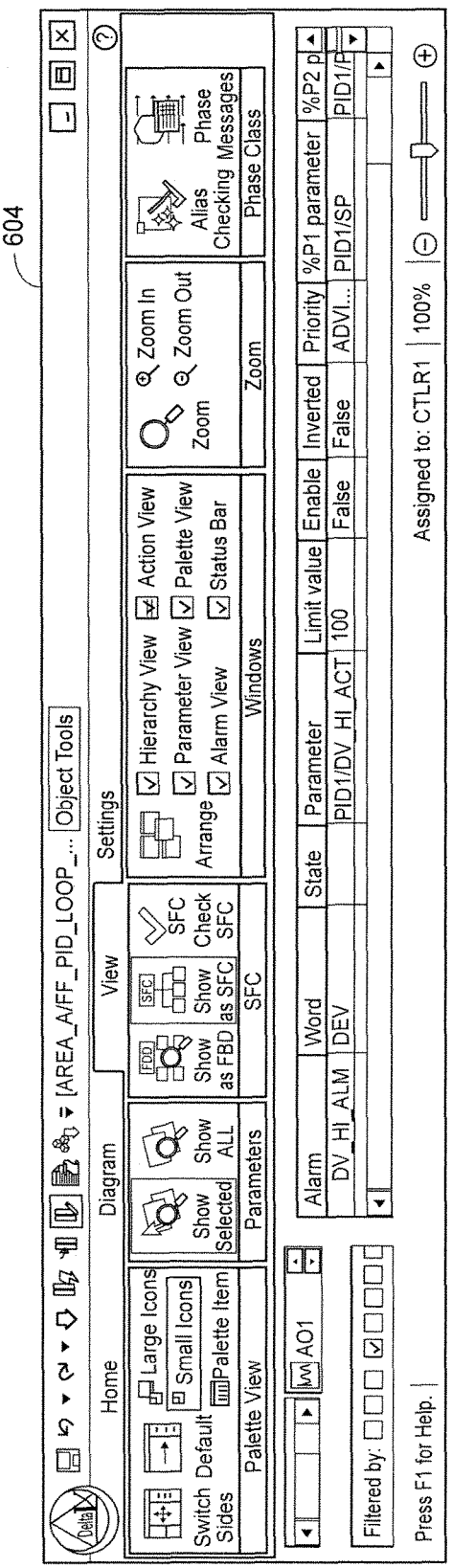
Figure 19:
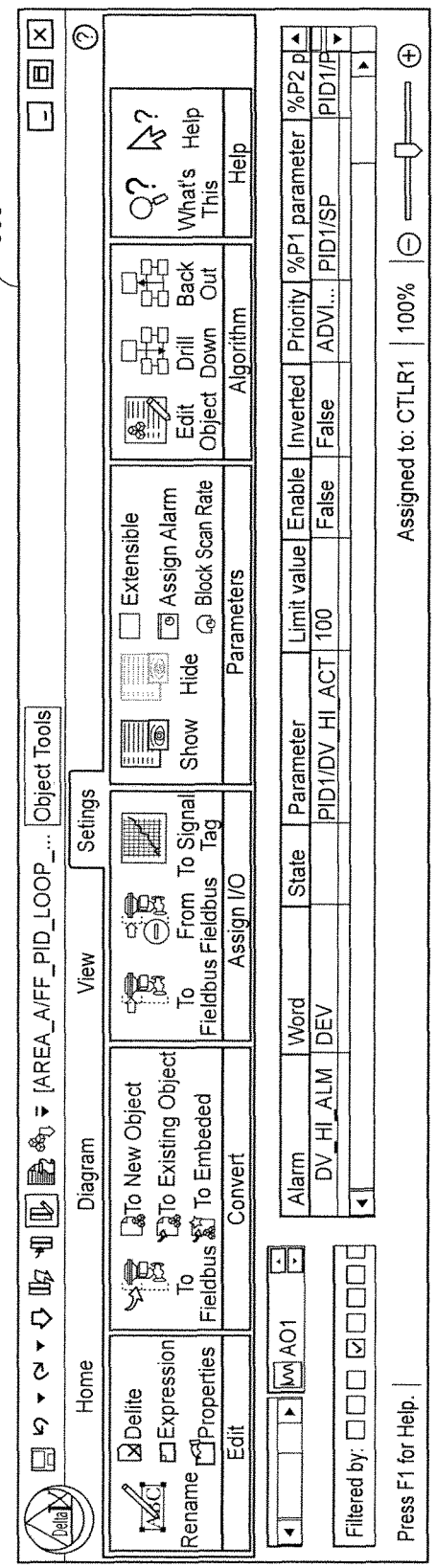
Figure 20:
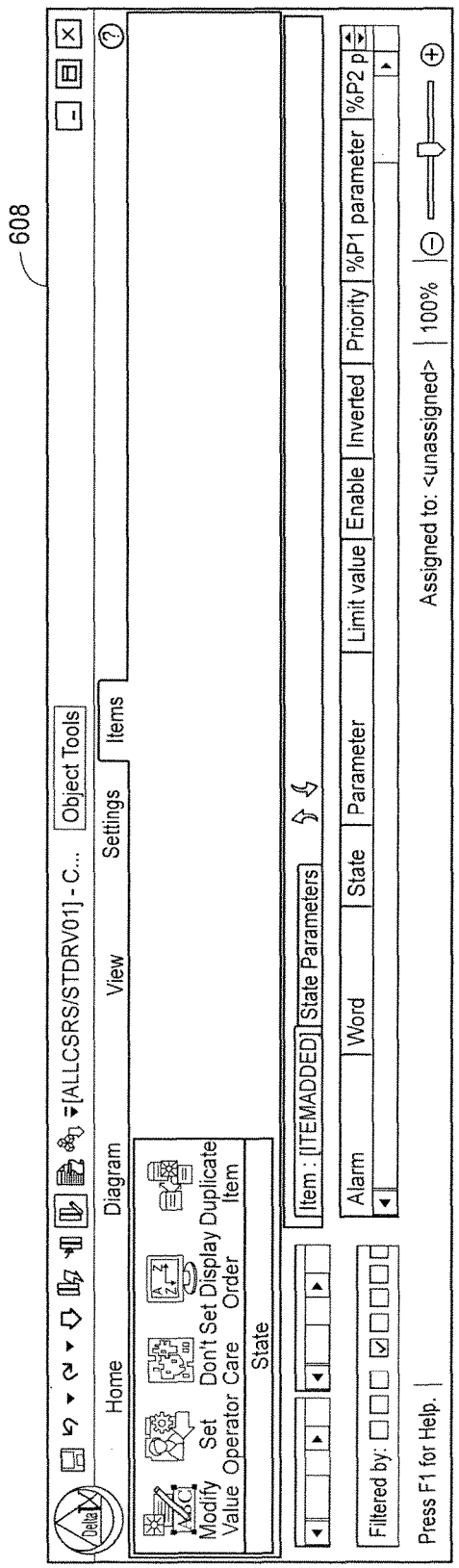
Figure 21:
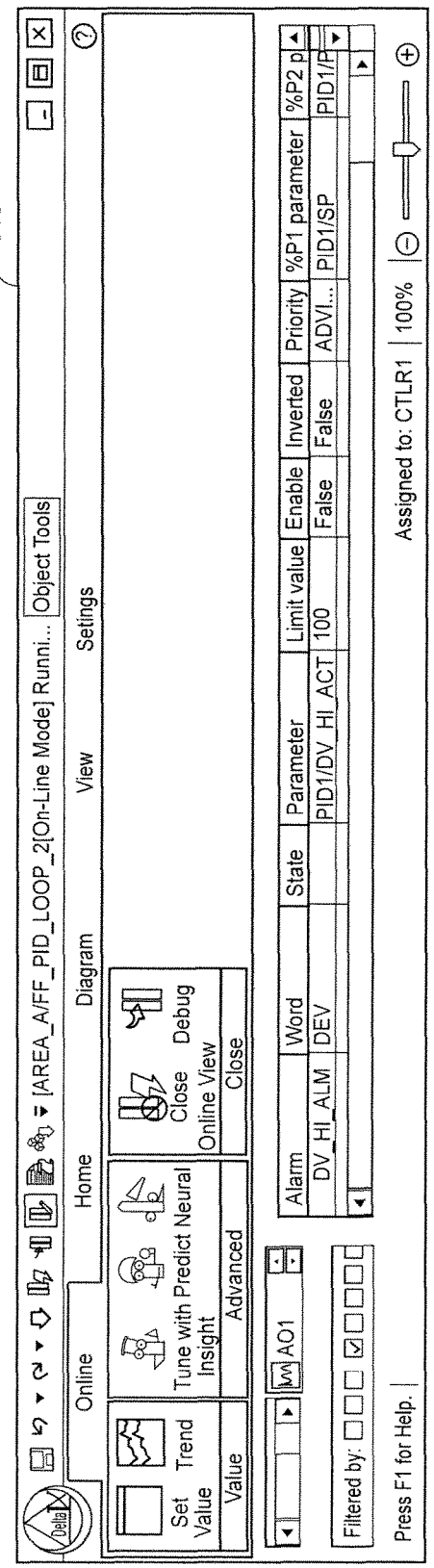
Figure 22:
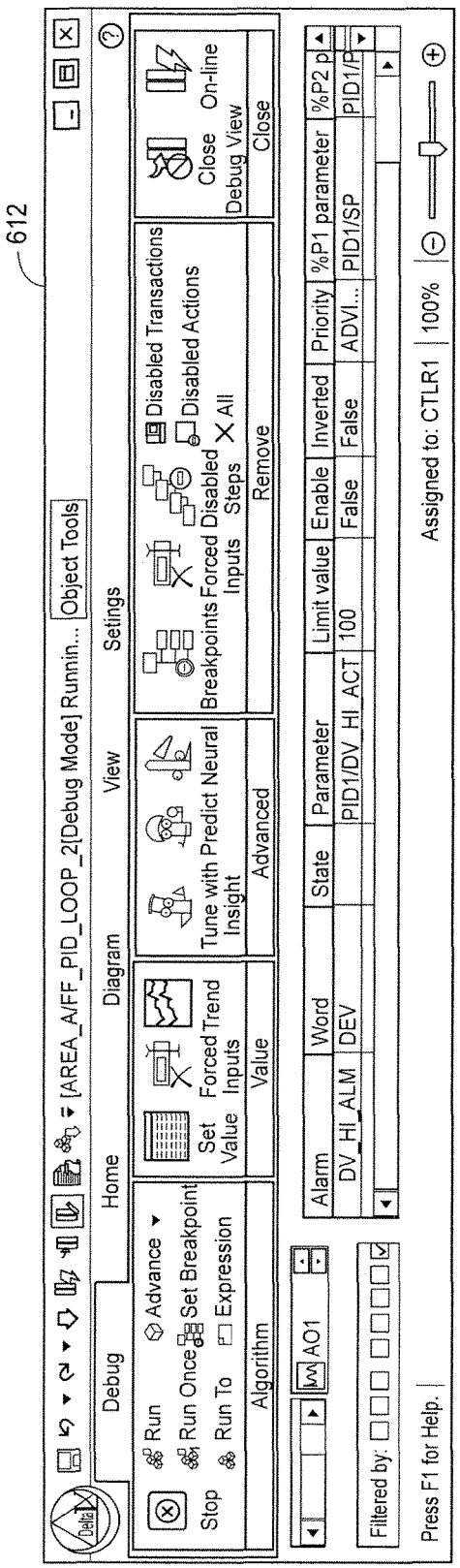
Figure 23:
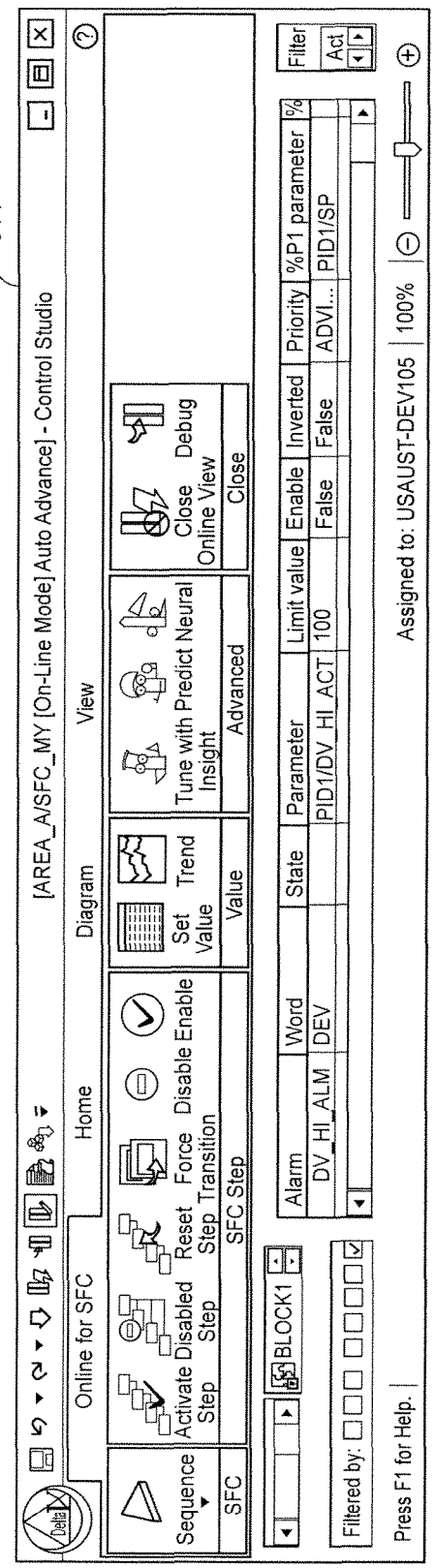
Figure 24:
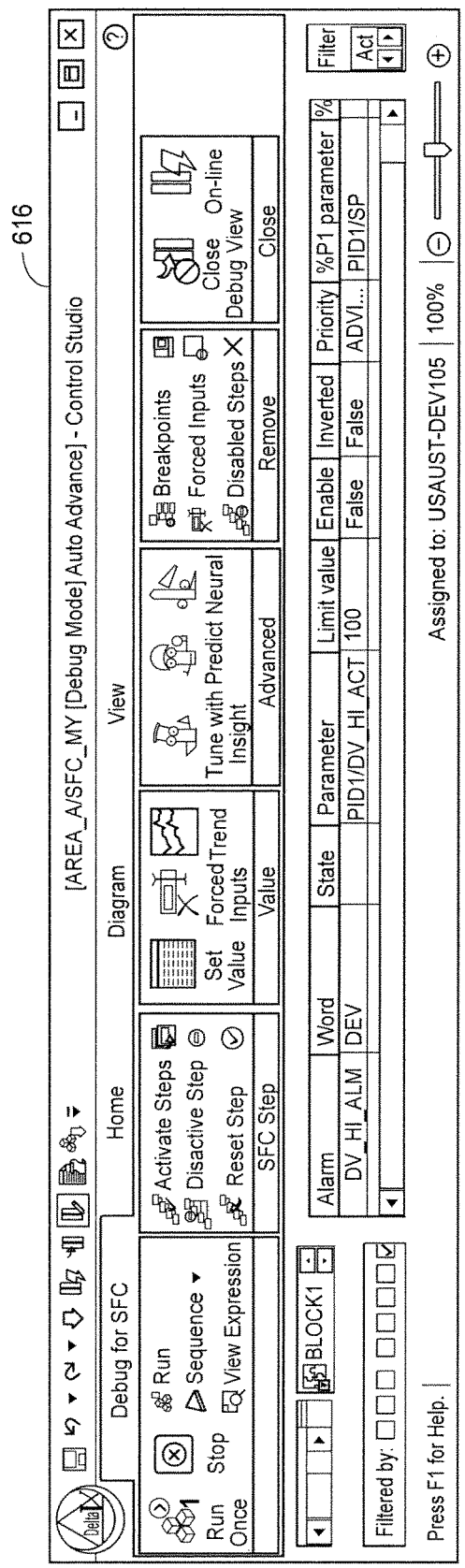

Further, FIG. 17 illustrates an operation state 602 corresponding to a selection of the "diagram" tab, FIG. 18 illustrates an operation state 604 corresponding to a selection of the "view" tab, and FIG. 19 illustrates an operation state 606 corresponding to a selection of the "settings" tab. Meanwhile, FIGS. 20-24 illustrate example operational states 608-616 in which the user interface 38 provides additional, context-specific tabs such as an "items" tab, an "online for SFC" tab, etc.

Figure 25:
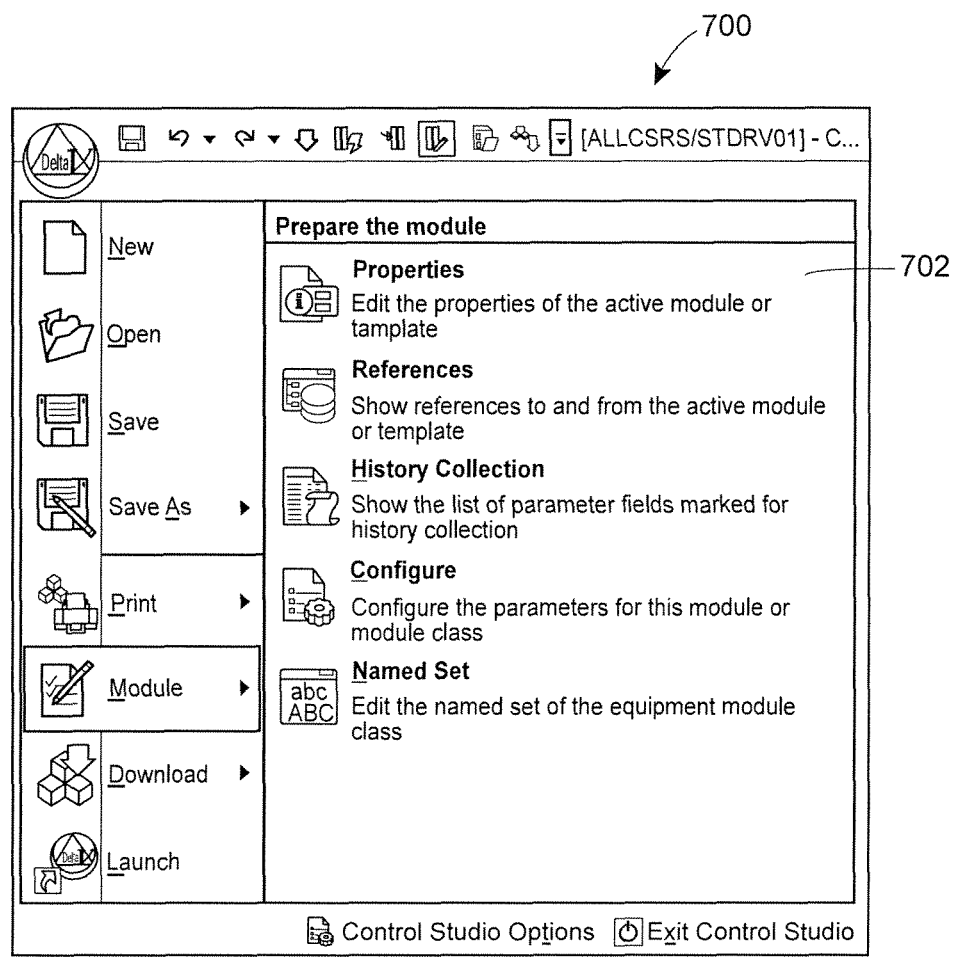
FIGS. 25 and 26 illustrate additional screens of the user interface of the system illustrated in FIG. 1.
Figure 26:
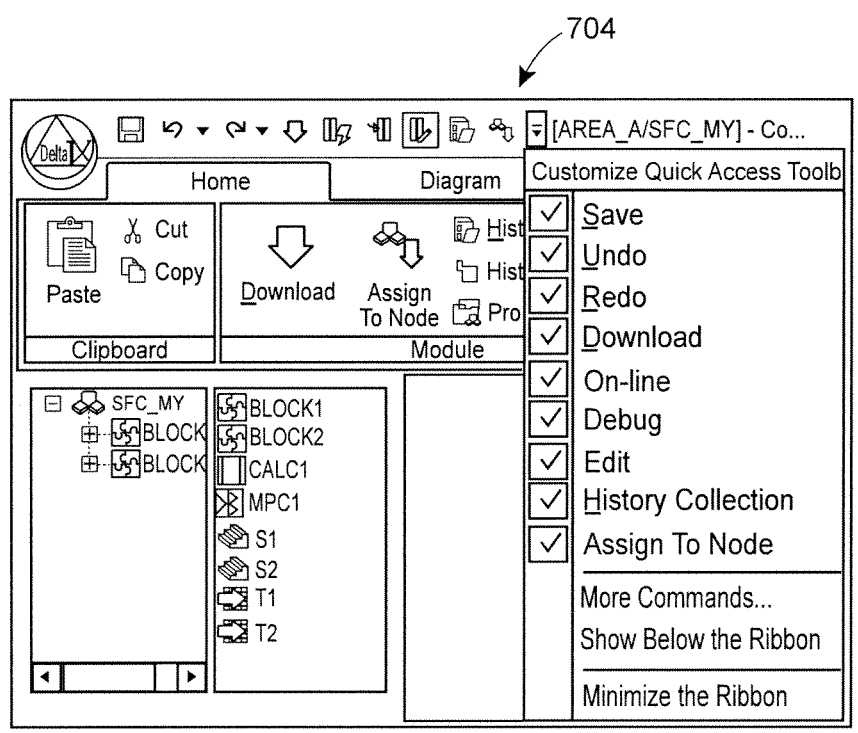

Finally, FIGS. 25 and 26 illustrate views 700 and 704 corresponding to selection of additional user options. In particular, FIG. 25 illustrates a menu of additional options related to module preparation. The options 702 may not be present on the ribbon 300 or the quick access bar 240 due to space constraints or the relative frequency of use, for example. Referring to FIG. 26, the view 704 corresponds to a user selecting quick access toolbar 240 customization options. It will be noted that in at least the views 700 and 704, the user interface 38 may rely on both context-specific and visual ribbon options and "traditional" option menus in the form of option lists, for example.

Generally speaking, a command pane such as the ribbon 300 may include any number of selectable controls, which may logically grouped according to common application areas or other principles, as discussed above. Meanwhile, the navigation pane 212 may display a large number of physical objects such as controllers, I/O cards, smart devices, legacy devices, as well as logical objects such as control strategies, areas, recipes, etc. During operation, the user interface of the control studio application 38A or the explorer application 38B dynamically adjusts selections displayed in the navigation pane 212 based on the selection of controls in the ribbon 300 and/or controls displayed in the ribbon 300 based on the selection in the navigation pane 212. Thus, the user interface will automatically remove inapplicable controls and/or add newly applicable controls if a user selects a particular device (e.g., a valve) in the navigation pane 212. Similarly, the user may enable a certain mode of operation via the ribbon 300 (e.g., trending analysis) that cannot apply to certain physical and logical objects, and the navigation pane 212 may accordingly reduce the set of objects listed under one or several tabs. Of course, the ribbon 300 also may be automatically adjusted based on a selection in the ribbon 300. In some embodiments, the user interface may adjust the ribbon 300 or the navigation pane 212 in view of several events (e.g., detecting a selection a particular area followed by a selection of a recipe via the navigation pane 212 prior to determining how the ribbon 300 should be adjusted).

IX. Layers

In another aspect, the user interface may support layers as a form of advanced functionality to help engineers visualize different aspects of the system configuration. For example, layers may used to distinguish between a module class structure and instance override. In some embodiments, all objects will be added on a first layer of a display by default. In other words, any display gadget or object within the display gadget may be defined with a default layer. If the default layer does not exist within the display, the layer can be automatically created and visible within the display. In at least the control studio application 38B, layers may be user-defined. In an embodiment, layers may be selected via the view tab on the ribbon 300. The display may appear and operate as a single layer when all layers are visible.

Figure 27:
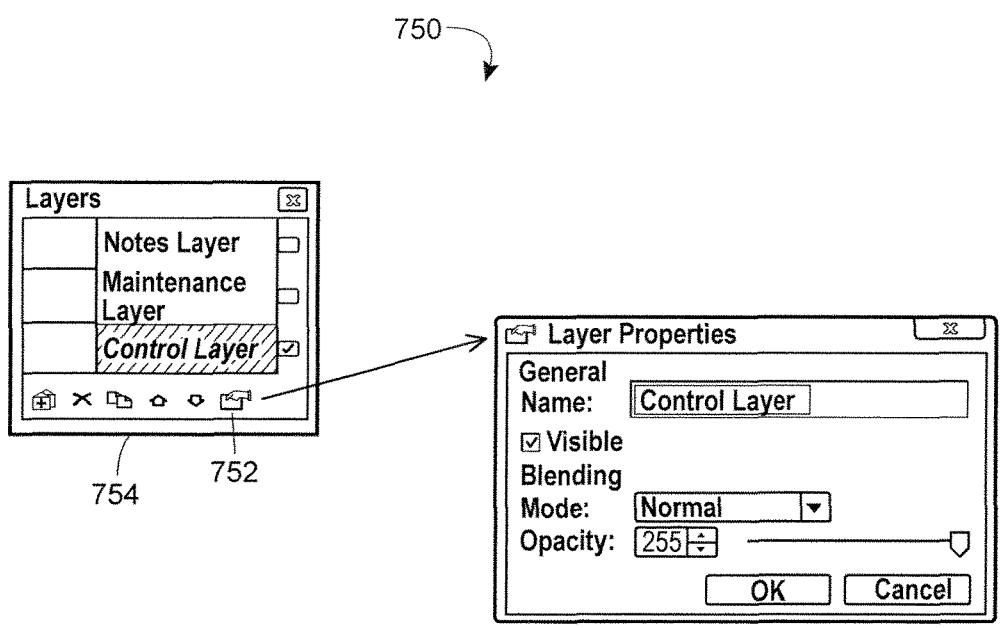
FIG. 27 is an example screen for defining layers in the process control system of FIG. 1.

In an embodiment, the user interface of the control studio application 38B supports a device tag layer to display device tag names in addition to the physical I/O path; a class layer to displays variant objects in a "transparent" manner within the main content area 210; a variant layer to displays class objects in a "transparent" manner within the main content area 210; a knowledge layer to display knowledge items such as hyperlinks associated with the selected control module or recipe; a documentation layer to display the embedded documents or comment boxes associated with the selected control module or recipe; and a graphics layer to display all graphics associated with the control module or recipe diagram displayed in the main content area 210. An example dialogue 750 for configuring a layer, activated upon clicking on an icon 752 in a layer viewing pane 754, is illustrated in FIG. 27.

X. Example Architecture

Figure 28:
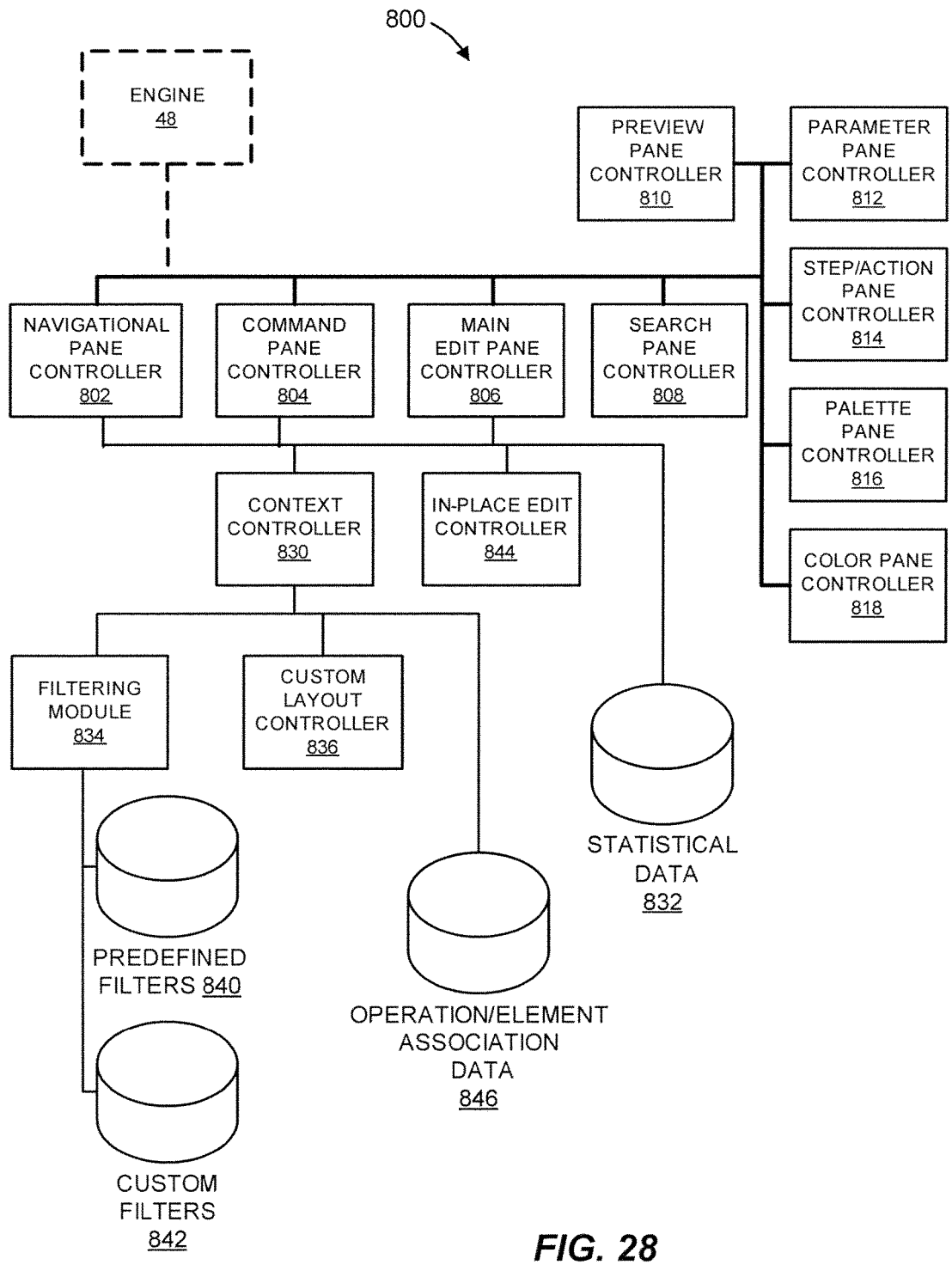
FIG. 28 is a block diagram of an example user interface generator that may operate in the system illustrated in FIG. 1.

FIG. 28 illustrated an example of a user interface controller 800 that may be used in one or both of the control studio application 38A and the explorer application 38B. The user interface controller 800 may include a navigational pane controller 802, a command pane controller 804, and a main/content edit pane controller 806 to generate and dynamically adjust the navigation pane 212, the command pane 300, and the main content pane 210, respectively. Further, each of a search pane controller 808, a preview pane controller 810, a parameter pane controller 812, a step/action pane controller 814, a palette pane controller 816, and a color pane controller 818 is configured to display a respective pane in one or both of the control studio application 38A and the explorer application 38B.

During operation, at least the controllers 802-806 interact with a context controller 830 that determines the range of operations applicable to a particular module, a range of items applicable to a particular operation, and other limitations that can reduce the number of controls or items being displayed on the screen. In other words, the context controller 830 determines which task the user is currently performing and to what the task is likely limited. The context controller 830 may also interact with a statistical database 832 to determine what operations are typically performed in a single session, which items users typically consider together, etc. In some embodiments, the context controller 830 further supports morphing techniques discussed in more detail below to adjust screen positioning, sizing, and selectively activate or deactivate screens in run-time based on the evolving context of user activity.

Further, the context controller 830 may interact with a filtering module 834 and a custom layout controller 836 to apply filters and custom settings related to pane organization, sizing, etc. As illustrated in FIG. 28, the filtering module 834 may consult both the predefined filter database 840 and a custom filter database 842.

Still further, the user interface controller 800 may include an in-place edit controller 844 to support in-place editing discussed above. Moreover, an operation/element association database 846 may provide information to the context controller 830 related to operations and elements on which these operation can be performed. For example, the operation/element association database 846 may specify a list of operations that can be performed on a recipe that includes viewing parameters, deferring parameters, assigning parameters, etc. Moreover, the operation/element association database 846 or the statistical database 832 may specify the relative probability that a certain function will be invoked. Generally speaking, one or both of these database can help the user interface controller 800 determine how likely a user is to invoke a specific function, so that the more "popular" options may be displayed in the command pane 300, and the less popular options may be relegated to hidden menus or, more generally, menus that are more difficult to reach.

Figure 29:
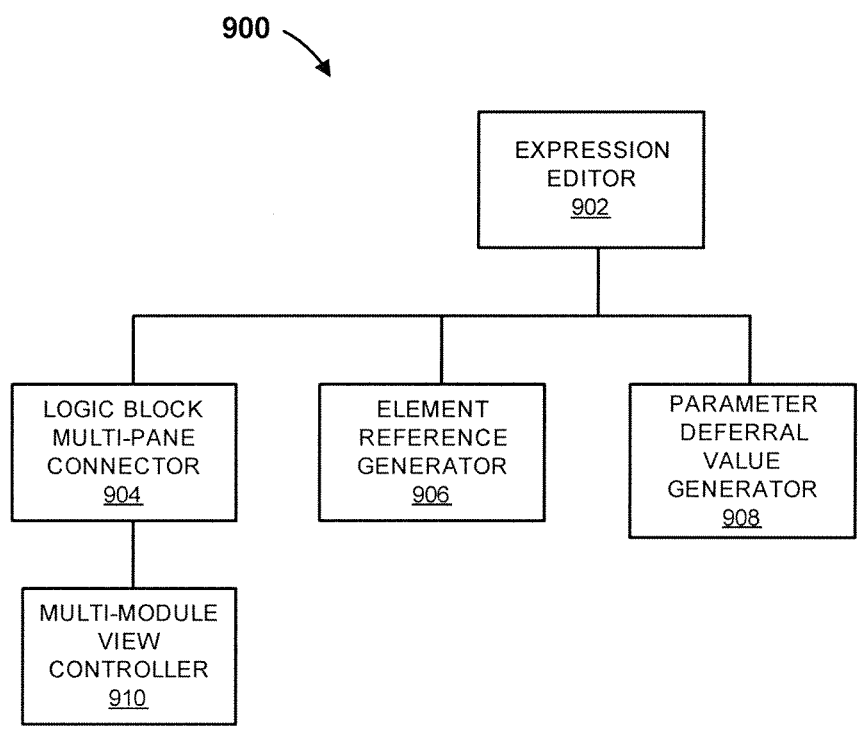
FIG. 29 is a block diagram of an example connection and parameter generation module that may operate together with the user interface of a control logic design application used in the system of FIG. 1.

Next, FIG. 29 illustrates a controller 900 which the control studio application 38A may additionally include to support some of the functionality specific to designing and debugging control logic. In particular, the controller 900 may include an expression editor 902 to implement expression editing discussed above, a logic block multi-pane connector 904 to implement connection techniques discussed below, an element reference generator 906 to support referencing techniques discussed herein, and a parameter deferral value generator to implement deferral and assignment techniques in recipe control, as explained below. The logic block multi-pane connector 904 may interact with a multi-view mode controller 910 to support parallel user operation in several edit panes.

XI. Connections Between Logic Block in a Multi-Mode View

Figure 30A:
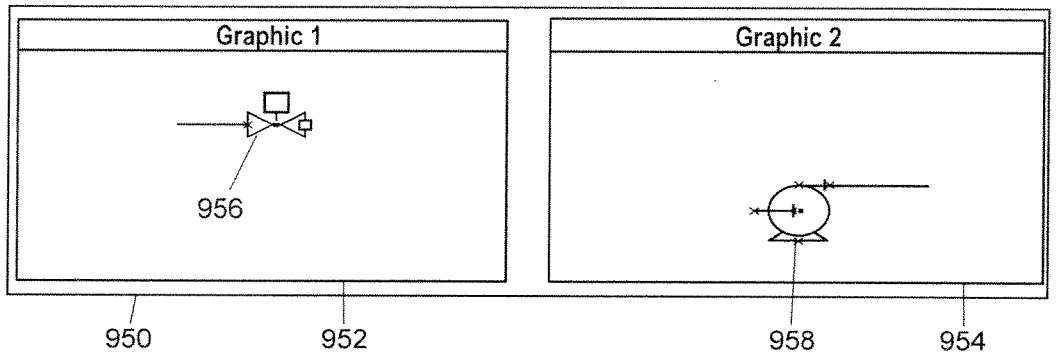
FIGS. 30A-C are example screens generated by the module illustrated in FIG. 28 when a user defines a connection between logical modules depicted in separate, independently activated and controlled, panes within a common edit area.
Figure 30B:
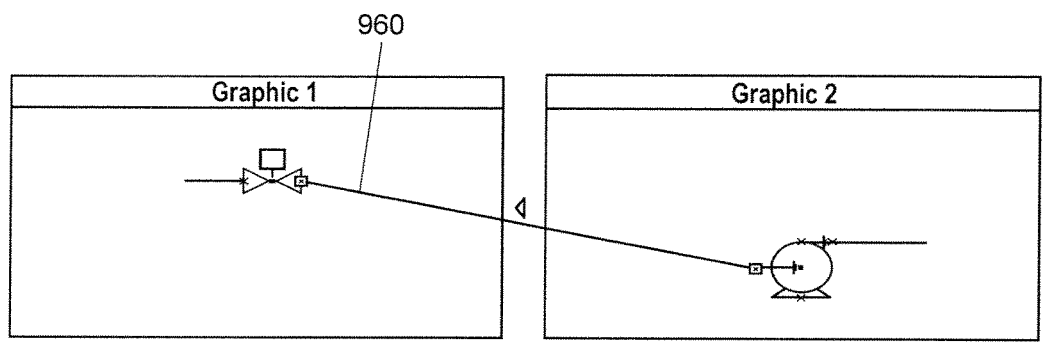
Figure 30C:
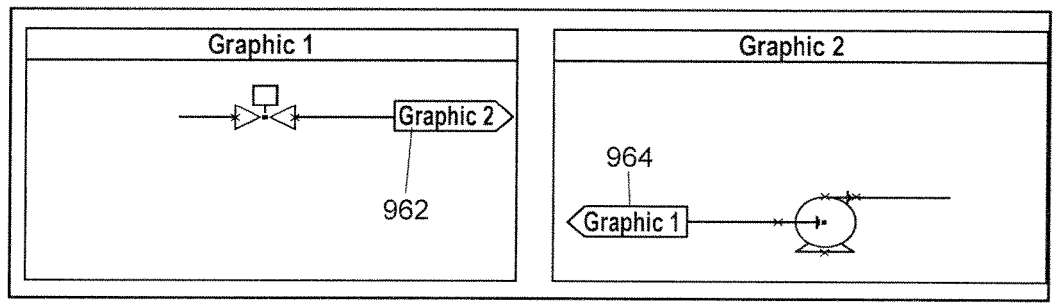

Referring to FIG. 30A, an edit area 950 may include edit panes 952 and 954 disposed next to each other for simultaneous use by an operator. Each of the edit panes 952 and 954 may have a scope of functionality similar to the main edit pane 210 discussed above. A user may choose to work with several edit panes such as the panes 952 and 954 to reduce clutter in an individual edit pane, for example. Each of the panes 952 and 954 may be independently docked, floated, sized, etc. In the example of FIGS. 30A-C, each of the edit panes 952 and 954 displays a respective graphic 956 (a valve) and a graphic 958 (a pump).

To connect the graphic 956 to the graphic 958, the user may activate an appropriate connection control (not shown), select an endpoint in one of the panes 952 and 954, and drag the connection outside the boundaries of the pane to the target graphic in the other one of the panes 952 and 954 (see FIG. 30B). For example, the user may select an input to the valve graphic 956 and drag the connector to the output of the pump graphic 958. The user interface advantageously permits the user to connect graphics depicted in different edit panes. To clearly depict the new connection, the user interface may further draw a connector 960 between the graphics 956 and 958. It will be noted that one portion of the connector 960 is in the pane 952, another portion is in the pane 954, and yet another portion is in the common area 950. In some embodiments, the connector 960 may be illustrated using a different color, style (e.g., broken line), thickness, etc. The user may subsequently move one of the panes 952 and 954, and the user interface will automatically adjust the connector 960 to preserve the illustration of the connection.

Further, the user interface may automatically generate data structures descriptive of the connection between the valve graphic 956 and the pump graphic 958. Additionally or alternatively, the user interface may generate tags 962 and 964 illustrated in FIG. 30C. Each of the tags 962 and 964 may identify a pane to which the connector is coupled. Of course, the user interface may similarly generate connectors between logic blocks such as Fieldbus function blocks, for example. Also, the number of edit panes in the common area 950 may be three, four, or any other desired number.

XII. Deferral and Assignment of Parameters in Recipe Configuration

FIGS. 31A-D illustrate parameter deferral and assignment which one or both of the applications 38A and 38B can support to simplify configuration of recipes used in batch control. As is known, a recipe for use in a batch execution environment is typically divided into routines at four levels: procedure level, unit procedure level, operation level, and phase (or phase class) level. Accordingly, an edit pane such as the main content pane 210 may display procedures, unit procedures, operations, and phase classes of a certain recipe in a table format. In the example scenario illustrated in FIGS. 31A-C, the user may select a phase class PC1 and click on the class PC1 to view the list of parameters (FIG. 31A). Next, the user may select the parameter PARAM1, drag the parameter to the operation OP1 using a mouse or a keyboard, and drop the parameter "into" the operation OP1. In response, the user interface automatically generates a parameter OP_PARAM1 (FIG. 30B). More specifically, the user interface applies a predefined naming convention to generate the name OP_PARAM1 based on the parameter name PARAM1, automatically generates a deferral link between the procedure PC1 and operation OP1, i.e., indicates that a batch executing the recipe must defer the resolution of the parameter PARAM1 to the operation level (in other words, the parameter PARAM1 is populated using the parameter OP_PARAM1). The user interface also updates the screen to display the automatically created parameter.

As illustrated in FIG. 31C, the user can also defer a parameter across several levels of recipe hierarchy. Thus, a user can select the parameter PARAM1 and drop the parameter into the procedure. It will be noted that in this case, the user interface generates several parameters, along with the corresponding structures, at the target level and each intermediate level. Thus, the user interface generates parameters PRC_PARAM1, UP_PARAM1, and OP_PARAM1.

Referring to FIG. 31D, a user can also drag-and-drop a parameter into an existing parameter to equate the parameters. In this example, the user specifies that the parameter PARAM1 is equal to the value of the operation-level parameter OP_EXISTING_PAR. In some embodiments, the user interface may automatically update the screen to indicate the connection between the newly linked parameters. For example, the user interface may draw a graphic indicator such a line connecting the source and target parameters (i.e., PARAM1 and OP_EXISTING_PAR). From the foregoing, it will be noted that the user can thus manipulate recipe parameters without invoking tedious dialogues, searching through menu options, and typing parameter names.

XIII. Morphing of User Screens

Further, the user interface of the applications 38A and 38B may support automatic morphing of screens to better anticipate future user actions and continuously adjust to the user in view of his or her prior actions. An example of morphing is illustrated in FIGS. 32A-C.

Figure 32A:
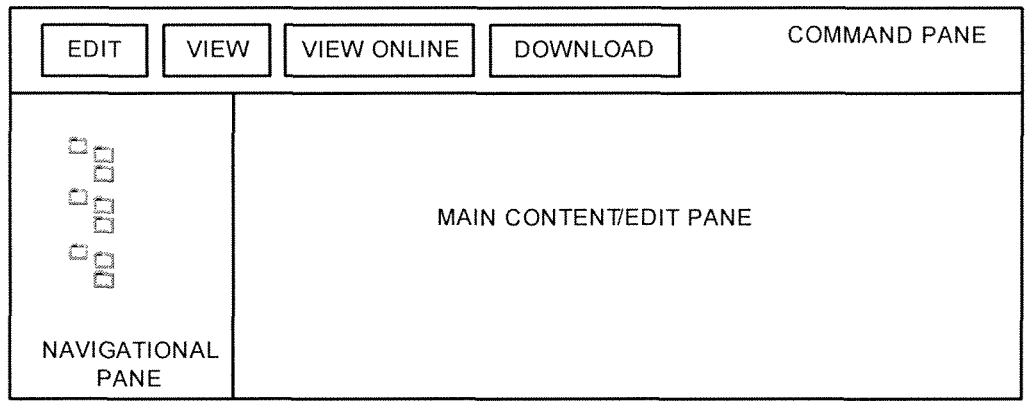
FIGS. 32A-C are block diagrams that schematically illustrate example of screen morphing provided by the user interface of the system illustrated in FIG. 1.
Figure 32B:
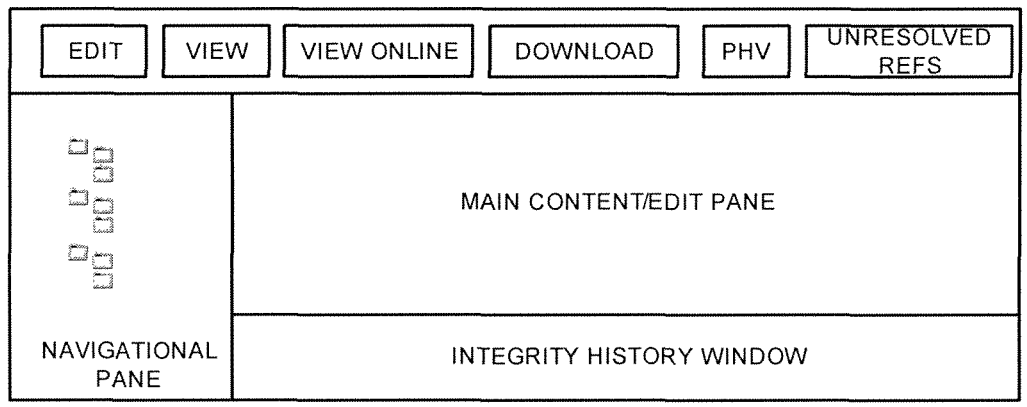
Figure 32C:
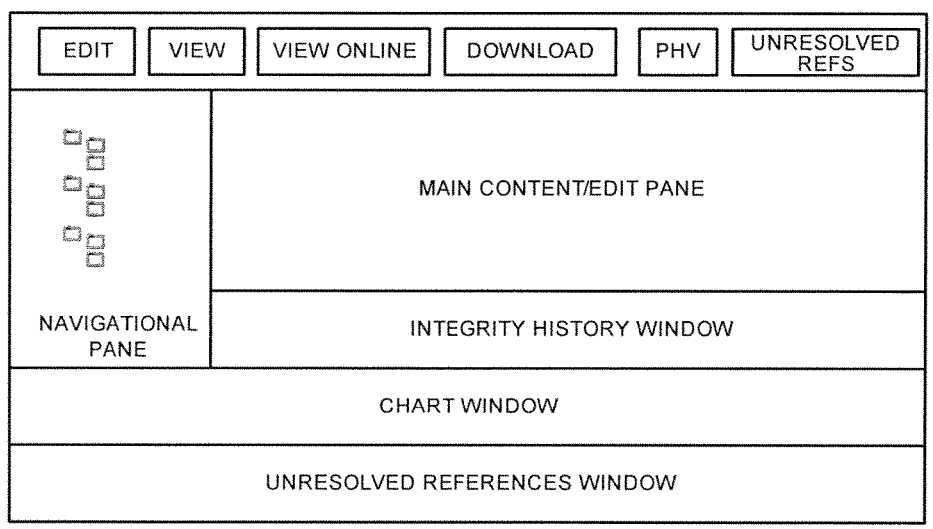

The user interface may initially present to a user a screen that includes a command pane with an original set of commands, a main content/edit pane, a navigational pane (FIG. 32A). Each of the displayed panes may be of a default size and in a default position relative to every other pane. The user may then activate the control "view" in the command pane, for example, to view a particular item selected in the navigational pane. In addition to providing the view requested by the user, the user interface may automatically take additional actions to morph, or adjust the screen in anticipation of future user actions. As illustrated in FIG. 32B, the user interface may automatically generate an integrity history window or pane, adjust the size of the main content pane to accommodate the new update, update the controls displayed in the command pane, etc. In response to the next user command, the user interface may morph the screen further (FIG. 32C).

Thus, the user interface may automatically adjust controls, pane sizes, fonts, and other attributes to adjust to the context of current user operations. If desired, the user interface may consider more than the last action taken by the user, and may morph the screen based on a certain number of prior user commands (or selections in the navigational pane).

XIV. Other Examples and Applications

Figure 33:
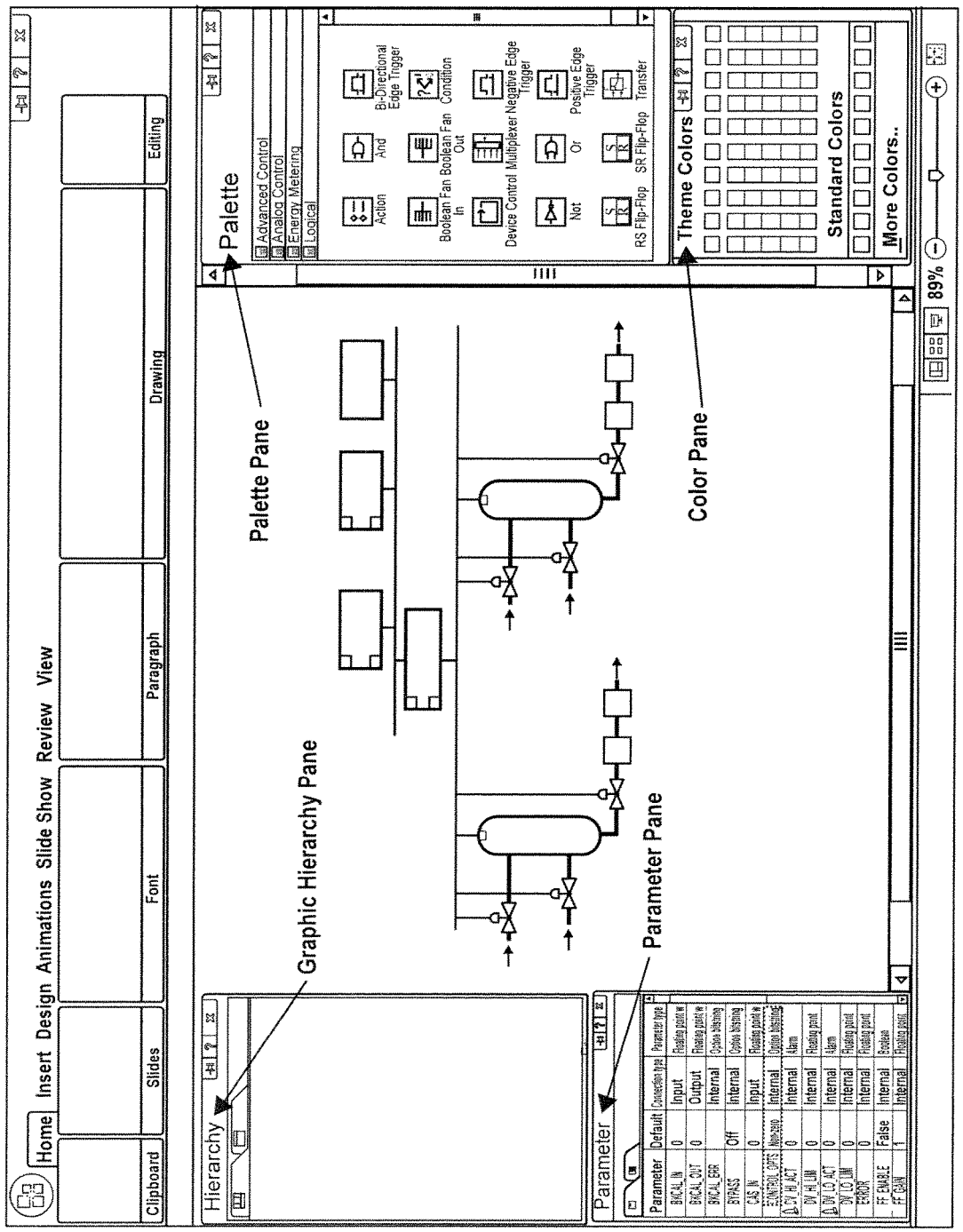
FIG. 33 is another example of a main user interface window of a software module operating in the environment depicted in FIG. 1.

FIG. 33 illustrates another example pane layout of the control studio application 38B. This layout may correspond to another user preference (as compared to the layout of FIG. 3) or a different user role, for example. In general, users may define and save any desired layout and filtering configuration.

Further, it will be noted that the methods discussed above may also be used in other software systems or modules related to process control networks. While the drawings discussed above illustrate a particular type of a software application, the principles illustrated therein may similarly apply to applications for exploring plant equipment, supervising control variables (e.g., sensor readings), etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control management method in a computer system for configuring and supervising a process plant, comprising:
   providing, by one or more processors, an interactive user interface to manage a plurality of objects in the process plant, wherein each of the plurality of objects corresponds to a physical or logical entity in the process plant, including:

generating, by one or more processors, a navigation pane displaying a set of selectable items, each in the set of selectable items corresponding to a respective one of the plurality of objects;

generating, by one or more processors, a content pane to display at least one item selected via the navigation pane;

generating, by one or more processors, a command pane to display a set of selectable controls logically grouped according to common application areas, each in the set of selectable controls corresponding to a task to be performed on at least one of the plurality of objects in the process plant, wherein the command pane displays a plurality of controls prior to the at least one item being selected via the navigation pane;

wherein the navigation pane displays the set of selectable items prior to at least one control of the selectable controls being selected via the command pane;

wherein the navigation pane, the content pane, and the command pane are displayed in a common screen;

receiving, by one or more processors, (i) a selection of an item in the set of selectable items via the navigation pane, and (ii) a selection of a control in the set of selectable controls via the command pane;

adjusting, by one or more processors, the command pane to display selectable controls in the command pane that are applicable to the item selection in the navigation pane, and to remove selectable controls in the command pane that are not applicable to the item selection in the navigation pane, adjusting, by one or more processors, the navigation pane to display selectable items in the navigation pane that are applicable to the control selection in the command pane, and to remove selectable items in the navigation pane that are not applicable to the control selection in the command pane;

adjusting, by one or more processors, the selectable items displayed within the navigation pane based upon a proximity of a cursor to the at least one item displayed within the content pane; and generating, by one or more processors, an integrity history pane upon a user selecting items via the navigation pane and controls via the command pane, such that the integrity history pane includes a set of navigational indicators that reflect a history of selecting a particular item or control wherein the at least one item displayed within the content pane is from among a plurality of items, each item from among the plurality of items being associated with a respective item selected via the navigation pane, and wherein the act of adjusting the selectable items displayed within the navigation pane includes adjusting the selectable items displayed within the navigation pane based upon which of the plurality of items displayed within the content pane the cursor is most proximate.

2. The method of claim 1, further comprising:
generating, by one or more processors, a new command pane to display information related to the control selection in the command pane; and
adjusting a size of at least the content pane to accommodate the new command pane within the common screen.

3. The method of claim 1, wherein one of the plurality of objects corresponds to one of a controller that implements at least a portion of process control logic in the process plant, a physical device that performs a physical function in the process plant, an input/output (I/O) card that processes input and output signals between physical devices in the process plant, or a workstation that implements a software to manage the process plant.

4. The method of claim 1, wherein one of the plurality of objects corresponds to one of a control strategy implemented by one or several devices operating in the process plant, an event reportable from a device operating in the process plant, or an area in the process plant in which one or several devices operate.

5. The method of claim 1, wherein generating the command pane includes:
displaying a plurality of regions of the command pane, each of the plurality of regions having a set of controls grouped according to at least one of a common category of functionality or use.

6. The method of claim 1, wherein adjusting the navigation pane further comprises:
displaying at least one additional selectable item not included in the set of selectable items that were displayed in the navigation pane prior to the control selection from the command pane, and
wherein adjusting the command pane further comprises:
displaying at least one additional selectable control not included in the plurality of selectable controls that were displayed in the command pane prior to the item selection from the navigation pane.

7. The method of claim 1, wherein the act of generating the integrity history pane further comprises:
generating the integrity history pane to include each navigational indicator as a control such that, when a navigational indicator is selected by a user, a path is restored to the particular selected item or control represented by the selected navigational indicator.

8. The method of claim 7, wherein the path is restored to the particular selected item or control represented by the selected navigational indicator via restoration of a focus to one of the particular selected item or control.

9. The method of claim 1, wherein the act of adjusting the selectable items displayed within the navigation pane includes one or more of adding, removing, or moving the selectable items.

10. The method of claim 1, further comprising:
receiving, by one or more processors, statistical data corresponding to a use of the interactive user interface, and wherein the act of adjusting the command pane further comprises:
removing one or more selectable controls in the command pane that are statistically unlikely to be invoked based upon a user's previous control selections in accordance with the received statistical data.

11. A user interface configuration method for use in a computer system for configuring and supervising a process plant, the method comprising:
generating, by one or more processors, a plurality of panes within a screen area, each of the plurality of panes being in a respective position and having a respective size, including:
generating, by one or more processors, a navigation pane to display a set of selectable items, each in the set of selectable items corresponding to a respective one of the plurality of objects;
generating, by one or more processors, a command pane to display a set of selectable controls, each in the set of selectable controls corresponding to a task to be performed on at least one of the plurality of objects in the process plant; and generating a main content pane to perform at least one of configuring or editing one of the plurality of objects selected via the navigation pane;

generating, by one or more processors, an integrity history pane upon a user selecting items via the navigation pane and controls via the command pane, wherein the command pane displays the set of selectable controls as controls prior to a selection of one or more of selectable items via the navigation pane, wherein the navigation pane displays the set of selectable items prior to at least one control of the selectable controls being selected via the command pane, and wherein the integrity history pane displays a set of navigational indicators that reflect a history of selecting a particular item or control, receiving, by one or more processors, a customization request from a user, wherein the customization request is related to at least one of the plurality of panes and specifies at least one of:
a position of the at least one of the plurality of panes; and
a size of the at least one of the plurality of panes;

wherein the customization request further specifies a filter to be applied in the navigation pane and the command pane, wherein the filter specifies (i) a first rule according to which selectable items in the navigation pane that are applicable to the control selection in the command pane are displayed and selectable items in the navigation pane that are not applicable to the control selection in the command pane are not displayed, and (ii) and second rule according to which selectable controls in the command pane that are applicable to the item selection in the navigation pane are displayed and selectable controls in the command pane that are not applicable to the item selection in the navigation pane are not displayed;

generating, by one or more processors, a custom layout of the plurality of panes in accordance with the customization request including displaying the navigation pane and the command pane in accordance with the first and the second rule;

adjusting, by one or more processors, the selectable items in the navigation pane based upon a proximity of a cursor to the one of the plurality of objects selected from the navigation pane and displayed within the main content pane; and storing, by one or more processors, custom layout data descriptive of the custom layout in a database record corresponding to the user, wherein the at least one item displayed within the content pane is from among a plurality of items, each item from among the plurality of items being associated with a respective item selected via the navigation pane, and wherein the act of adjusting the selectable items displayed within the navigation pane includes adjusting the selectable items displayed within the navigation pane based upon which of the plurality of items displayed within the content pane the cursor is most proximate.

12. The method of claim 11, further comprising:
automatically restoring, by one or more processors, the custom layout in accordance with the custom layout data upon identifying a new login session of the user.

13. The method of claim 12, further comprising:
receiving, by one or more processors, a role selection from the user, wherein:
the user is associated with several roles,
storing the custom layout data includes associating the custom layout with the role selection and
automatically restoring the custom layout further includes identifying a role of the user and comparing the role to the role selection.

14. The method of claim 11, wherein the main content pane is from among two main content panes, and
wherein generating the custom layout includes positioning each of the two or main content panes relative to each other in accordance with the customization request.

15. The method of claim 11, wherein the customization request further specifies at least one of:
a placement of each of a plurality of text columns in the main content area;
a respective size of each of the plurality of text columns; and
a font size for each of the plurality of text columns.

16. The method of claim 11, wherein generating the integrity history pane further includes:
generating the integrity history pane to include each navigational indicator as a control such that, when a navigational indicator is selected by a user, a path is restored to the particular selected item or control represented by the selected navigational indicator.

17. The method of claim 16, wherein the path is restored to the particular selected item or control represented by the selected navigational indicator via restoration of a focus to one of the particular selected item or control.

18. The method of claim 11, wherein the act of adjusting the selectable items displayed within the navigation pane includes one or more of adding, removing, or moving the selectable items.

19. The method of claim 11, further comprising:
receiving, by one or more processors, statistical data corresponding to a use of the computer system, and wherein the act of adjusting the command pane further comprises:
removing one or more selectable controls in the command pane that are statistically unlikely to be invoked based upon a user's previous control selections in accordance with the received statistical data.

20. A process control management system stored as a set of instructions on a computer readable medium and executable on a processor for configuring a process control system implemented in a process plant, comprising:
a user interface controller configured to display a plurality of objects and to receive commands to manage the plurality of objects,
wherein each of the plurality of objects corresponds to a physical or logical entity in the process plant, the user interface controller including:
a navigation pane controller configured to display a set of selectable items in a navigation pane, each in the set of selectable items corresponding to a respective one of the plurality of objects;
a content pane controller configured to display at least one item in a content pane that was selected via the navigation pane;
a command pane controller configured to display a set of selectable controls in a command pane that are logically grouped according to common application areas, each in the set of selectable controls corresponding to a task to be performed on at least one of the plurality of objects in the process plant; and a context controller configured to display an integrity history pane upon a user selecting items via the navigation pane and controls via the command pane, wherein the command pane originally displays a plurality of default controls prior to the at least one item being selected via the navigation pane, wherein the navigation pane displays the set of selectable items prior to at least one control of the selectable controls being selected via the command pane, wherein the navigation pane, the content pane and the command pane are included with a common screen, and wherein the integrity history pane displays a set of navigational indicators that reflect a history of selecting a particular item or control, wherein the user interface controller is configured to receive a selection of (i) an item in the set of selectable items via the navigation pane controller, and (ii) a selection of a control in the set of selectable controls via the command pane controller; and wherein the context controller is further configured to determine the selection received via the user interface controller and to (i) adjust the navigation pane to display items in the navigation pane that are applicable to the control selection in the command pane, and to remove selectable controls in the navigation pane that are not applicable to the control selection in the command pane, (ii) adjust the command pane to display selectable controls in the command pane that are applicable to the item selection in the navigation pane, and to remove selectable controls in the command pane that are not applicable to the item selection in the navigation pane, and (iii) adjust the set of selectable items in the navigation pane based upon a proximity of a cursor to the at least one item displayed within the content pane, wherein the at least one item displayed within the content pane is from among a plurality of items, each item from among the plurality of items being associated with a respective item selected via the navigation pane, and wherein the context controller is further configured to adjust the set of selectable items displayed within the navigation pane based upon which of the plurality of items displayed within the content pane the cursor is most proximate.

21. The system of claim 20, wherein the context controller is further configured to activate and deactivate additional panes based on the determined selection received via the user interface controller.

22. The system of claim 20, wherein the context controller is further configured to automatically reposition and resize at least one of the navigation pane, the command pane, or a third pane based on the determined selection received via the user interface controller.

23. The system of claim 20, wherein the context controller is further configured to generate the integrity history pane to include each navigational indicator as a control such that, when a navigational indicator is selected by a user, a path is restored to the particular selected item or control represented by the selected navigational indicator.

24. The system of claim 23, wherein the context controller is further configured to restore the path to the particular selected item or control represented by the selected navigational indicator via restoration of a focus to one of the particular selected item or control.

25. The system of claim 20, wherein the context controller is further configured to adjust the set of selectable items displayed within the navigation pane by adding, removing, or moving the set of selectable items.

26. The system of claim 20, wherein the user interface controller is further configured to receive statistical data corresponding to a use of the process control management system, and wherein the context controller is further configured to remove one or more selectable controls in the command pane that are statistically unlikely to be invoked based upon a user's previous control selections in accordance with the received statistical data.

* * * * *